(12) United States Patent
Saes et al.

(10) Patent No.: US 11,432,387 B2
(45) Date of Patent: Aug. 30, 2022

(54) MODULAR LIGHTING APPLICATION

(71) Applicant: Eldolab Holding B.V., Eindhoven (NL)

(72) Inventors: Marc Saes, Eindhoven (NL); Stephen Haight Lydecker, Snellville, GA (US); Tijs Versteegde, Eindhoven (NL)

(73) Assignee: eldoLAB Holding B.V., Eindhoven (NL)

( * ) Notice: Subject to any disclaimer, the term of this patent is extended or adjusted under 35 U.S.C. 154(b) by 300 days.

(21) Appl. No.: 16/095,252

(22) PCT Filed: Apr. 21, 2017

(86) PCT No.: PCT/NL2017/050255
§ 371 (c)(1),
(2) Date: Oct. 19, 2018

(87) PCT Pub. No.: WO2017/183979
PCT Pub. Date: Oct. 26, 2017

(65) Prior Publication Data
US 2019/0141802 A1    May 9, 2019

(30) Foreign Application Priority Data
Apr. 22, 2016  (NL) .................................. 2016662

(51) Int. Cl.
*H05B 45/10* (2020.01)
*H05B 45/325* (2020.01)
(Continued)

(52) U.S. Cl.
CPC .............. *H05B 45/48* (2020.01); *F21S 2/005* (2013.01); *H05B 45/10* (2020.01); *H05B 45/325* (2020.01);
(Continued)

(58) Field of Classification Search
CPC ........ H05B 45/37; H05B 45/48; H05B 45/10; H05B 33/083; H05B 33/0815; F21S 2/005
(Continued)

(56) References Cited

U.S. PATENT DOCUMENTS

2004/0233889 A1* 11/2004 Fujita ................... H04B 1/7183
370/350
2006/0022214 A1  2/2006 Morgan et al.
(Continued)

FOREIGN PATENT DOCUMENTS

CN       104106312 A    10/2014
WO    2013085381 A2     6/2013

OTHER PUBLICATIONS

PCT Publication No. WO 2017/183979 A2 for International Application No. PCT/NL2017/050255, published Oct. 26, 2017, 84 pages.
(Continued)

*Primary Examiner* — Alexander H Taningco
*Assistant Examiner* — Amy X Yang
(74) *Attorney, Agent, or Firm* — RatnerPrestia

(57) ABSTRACT

A modular system includes an LED driver and an LED light engine. The driver includes a switched mode power converter and a first control unit to control a switch of the converter, thereby controlling the supply current to an LED assembly of the light engine. The assembly includes LEDs and one or more switches arranged in series or in parallel with one or more of the LEDs. The light engine also includes a second control unit controlling the one or more switches of the LED assembly so as to control current through the LEDs. The first control unit controls amplitude of the supply current. The second control unit controls duty cycle of the LED current through the LEDs. The first and second control (Continued)

units are configured to synchronize a switching operation of the switched mode power converter with a switching operation of the switches of the light engine.

17 Claims, 18 Drawing Sheets

(51) Int. Cl.
　　　H05B 45/48　　　　(2020.01)
　　　H05B 45/3725　　 (2020.01)
　　　F21S 2/00　　　　 (2016.01)
　　　H05B 45/375　　　(2020.01)
　　　H05B 45/38　　　　(2020.01)
(52) U.S. Cl.
　　　CPC ....... *H05B 45/3725* (2020.01); *H05B 45/375* (2020.01); *H05B 45/38* (2020.01)
(58) Field of Classification Search
　　　USPC ........................................................ 315/291
　　　See application file for complete search history.

(56) References Cited

U.S. PATENT DOCUMENTS

| | | | | |
|---|---|---|---|---|
| 2007/0244366 A1* | 10/2007 | Murata | ............. | A61B 1/00105 600/175 |
| 2008/0116818 A1* | 5/2008 | Shteynberg | ........ | H05B 33/0815 315/192 |
| 2008/0238337 A1* | 10/2008 | Masood | ................ | H05B 45/37 315/294 |
| 2011/0043125 A1* | 2/2011 | Peeters | .................. | H05B 45/10 315/287 |
| 2011/0296065 A1* | 12/2011 | Daecke | ................... | H04L 7/044 710/61 |
| 2012/0187845 A1 | 7/2012 | Saes et al. | | |
| 2012/0235589 A1* | 9/2012 | Slot | .................... | H05B 33/0818 315/210 |
| 2013/0106298 A1* | 5/2013 | Datta | ................. | H05B 33/0815 315/186 |
| 2014/0293496 A1* | 10/2014 | Oldynski | .................. | H05F 3/06 361/213 |
| 2014/0333229 A1* | 11/2014 | Saes | ................... | H05B 33/0812 315/307 |
| 2015/0022112 A1* | 1/2015 | Nietfeld | ............ | H05B 33/0827 315/210 |
| 2015/0123550 A1 | 5/2015 | Kunst et al. | | |
| 2016/0088697 A1 | 3/2016 | Yan et al. | | |
| 2016/0338160 A1* | 11/2016 | Wacheux | .............. | F21S 41/663 |
| 2018/0234021 A1* | 8/2018 | Angelin | ................. | H05B 45/38 |
| 2018/0268174 A1* | 9/2018 | Bathurst | ................ | G06F 21/81 |

OTHER PUBLICATIONS

Written Opinion in International Application No. PCT/NL2017/050255, dated Dec. 11, 2017, 27 pages.
International Search Report for priority application NL2016662 dated Feb. 7, 2017, 19 pages.
PCT Publication No. WO 2017/183979 A3 for International Application No. PCT/NL2017/050255, republished Jan. 11, 2018 with International Search Report, 9 pages.
English translation of Chinese Office Action in Chinese Application No. 201780025023 dated May 28, 2020 (14 pages).

* cited by examiner

MODULAR LIGHTING APPLICATION

This application is a U.S. National Phase Patent Application of International Application No. PCT/NL2017/050255, filed Apr. 21, 2017, which claims priority to Netherlands Application No. NL 2016662, filed Apr. 22, 2016, the disclosures of which also are entirely incorporated herein by reference.

The invention relates to the field of lighting applications, in particular LED based lighting applications.

BACKGROUND OF THE INVENTION

The present invention relates to LED based lighting applications. Typically, such lighting application comprise a power source or power converter that is configured to supply a current to an LED assembly comprising one or more LEDs. In known applications, LEDs producing light of different colours are often combined, in order to realize a light source having an adjustable colour output. In order to realize such an adjustable colour output, the relative intensities of LED of different colour are adjusted, e.g. by operating the LEDs of different colour at different duty cycles.

In general, an intensity of an LED based lighting application may be adjusted by adjusting the amplitude of the current through the LED or by operating the LED at an adjustable duty cycle. In the latter case, the current through the LED may be reduced to a lower value, e.g. zero during a particular percentage of the time, thus reducing the average intensity. Such process, also referred to as duty cycle dimming, is performed at a comparatively high frequency that is not visible for the human eye or which cannot be perceived by cameras or the like either.

At present, LED assemblies and power sources for driving the LED assemblies, also referred to as LED drivers, are strongly linked. As such, it may be cumbersome to combine an LED driver with different LED assemblies. Typical problems that may e.g. arise are the incapability of an LED driver to address multiple groups of LEDs in an LED assembly or to attain or influence certain visual effects.

SUMMARY OF THE INVENTION

It would be desirable to provide in LED based lighting applications having an improved flexibility and modularity.

To better address these concerns, in a first aspect of the invention, there is provided a modular system comprising a first component comprising an LED driver and a second component comprising a light engine;
the LED driver comprising:
   a switched mode power converter configured to output a supply current;
   a first control unit configured to control a switch of the switched mode power converter, thereby controlling the supply current;
the light engine comprising:
   an LED assembly configured to receive the supply current, the LED assembly comprising a plurality of LEDs and one or more switches arranged in series or in parallel with one or more LEDs of the plurality of LEDs, and
   a second control unit configured to control the one or more switches of the LED assembly, thereby controlling an LED current through the plurality of LEDs; wherein
the first control unit is configured to control an amplitude of the supply current, the second control unit is configured to control a duty cycle of the LED current through the plurality of LEDs and wherein the first and second control unit are configured to synchronize a switching operation of the switch of the switched mode power converter with a switching operation of the one or more switches of the light engine.

According to another aspect of the present invention, there is provided a modular system comprising a first component comprising an LED driver and a second component comprising a light engine;
the LED driver comprising:
   a switched mode power converter configured to output a supply current;
   a first control unit configured to control a switch of the switched mode power converter, thereby controlling the supply current;
the light engine comprising:
   an LED assembly configured to receive the supply current, the LED assembly comprising a plurality of LEDs and one or more switches arranged in series or in parallel with one or more LEDs of the plurality of LEDs, and
   a second control unit configured to control the one or more switches of the LED assembly, thereby controlling an LED current through the plurality of LEDs;
the system further comprising a main control unit configured to:
   receive, at an input terminal, a set point representing a desired illumination characteristic of the LED assembly;
   determine, based on the received set point, a current amplitude modulation scheme and a duty cycle modulation scheme;
   provide a first output signal representative of the current amplitude modulation scheme to the first control unit and a second output signal representative of the duty cycle modulation scheme to the second control unit;
wherein the first and second control unit are respectively configured to apply the current amplitude modulation scheme and the duty cycle modulation scheme within a modulation time window, in order to generate the desired illumination characteristic.

According to yet another aspect of the present invention, there is provided a light engine comprising:
   an LED assembly configured to receive a supply current from an LED driver, the LED assembly comprising a plurality of LEDs and one or more switches arranged in series or in parallel with one or more LEDs of the plurality of LEDs, and
   a control unit configured to control the one or more switches of the LED assembly, thereby controlling an LED current through the plurality of LEDs;
the control unit further being configured to:
   receive, at an input terminal, a set point representing a desired illumination characteristic of the LED assembly;
   determine, based on the received set point, a current amplitude modulation scheme and a duty cycle modulation scheme;
   output a first output signal representative of the current amplitude modulation scheme for processing by an LED driver control unit of the LED driver;
wherein the current amplitude modulation scheme represents an amplitude of the supply current to be provided by the LED driver as a function of time within a modulation time window and the duty cycle modulation scheme represents switching operations for the one or more switches as a function of time within the modulation time window and wherein the current amplitude modulation scheme and the duty cycle modulation scheme are configured to, when applied by the LED driver control unit and the control unit, to generate the desired illumination characteristic.

According to yet another aspect of the present invention, there is provided an LED driver comprising:
  a switched mode power converter configured to output a supply current for powering an LED assembly;
  a control unit configured to control a switch of the switched mode power converter, thereby controlling the supply current;
  wherein the control unit is further configured to:
  receive, at an input terminal of the control unit, LED assembly information describing the LED assembly to be powered;
  receive, at the input terminal, a set point representing a desired illumination characteristic to be generated, during use, by the LED assembly;
  determine, based on the received set point, a current amplitude modulation scheme and a duty cycle modulation scheme;
  output a first output signal representative of the duty cycle modulation scheme for processing by an LED assembly control unit of the LED assembly that is to be powered;
  wherein the current amplitude modulation scheme represents an amplitude of the supply current to be provided by the LED driver as a function of time within a modulation time window and the duty cycle modulation scheme represents switching operations for the LED assembly as a function of time within the modulation time window and wherein the current amplitude modulation scheme and the duty cycle modulation scheme are configured to, when applied by the LED assembly control unit and the control unit, to generate the desired illumination characteristic.

According to yet another aspect of the present invention, there is provided a modular system comprising a first component comprising an LED driver, a second component comprising a light engine and a third component comprising an interface module, the interface module comprising:
  an input terminal for connecting to an output terminal of the LED driver;
  an output terminal for connecting to an input terminal of the light engine;
  a switch assembly for controlling a current received via the input terminal of the LED driver and provided to the light engine via the output terminal;
  a control unit having an input terminal for receiving a set point representing a desired illumination characteristic of the light engine, the control unit further having a processing unit for processing the set point and determining control signals for the switch assembly.

According to yet another aspect of the present invention, there is provided an interface module for use in a lighting application, the interface module comprising:
  an input terminal for connecting to an output terminal of an LED driver;
  an output terminal for connecting to an input terminal of a light engine;
  a switch assembly for controlling a current received via the input terminal from the LED driver and provided to the light engine via the output terminal;
  a control unit having an input terminal for receiving a set point representing a desired illumination characteristic of the light engine, the control unit further having a processing unit for processing the set point and determining control signals for the switch assembly.

According to yet another aspect of the present invention, there is provided a modular system comprising a first component comprising an LED driver, a second component comprising a light engine and a third component comprising an interface module,
  the light engine comprising a plurality of LEDs or LED groups;
  the interface module comprising:
  an input terminal for connecting to an output terminal of the LED driver;
  an output terminal for connecting to an input terminal of the light engine;
  a switch assembly comprising one or more switches for controlling a supply current of the LED driver, the supply current being received via the input terminal and provided to the light engine via the output terminal;
  a control unit having an input terminal for receiving a set point representing a desired illumination characteristic of the light engine, the control unit further having a processing unit for processing the set point and determining control signals for the switch assembly, the LED driver comprising:
  a switched mode power converter configured to output the supply current;
  an LED driver control unit configured to control a switch of the switched mode power converter, thereby controlling the supply current;
wherein the control unit and the LED driver control unit are configured to co-operate and control the supply current and the supply of the supply current to the light engine in accordance with the desired illumination characteristic, and wherein the control unit and the LED driver control unit are configured to synchronize a switching operation of the switch of the switched mode power converter with a switching operation of the one or more switches of the switch assembly of the light engine.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
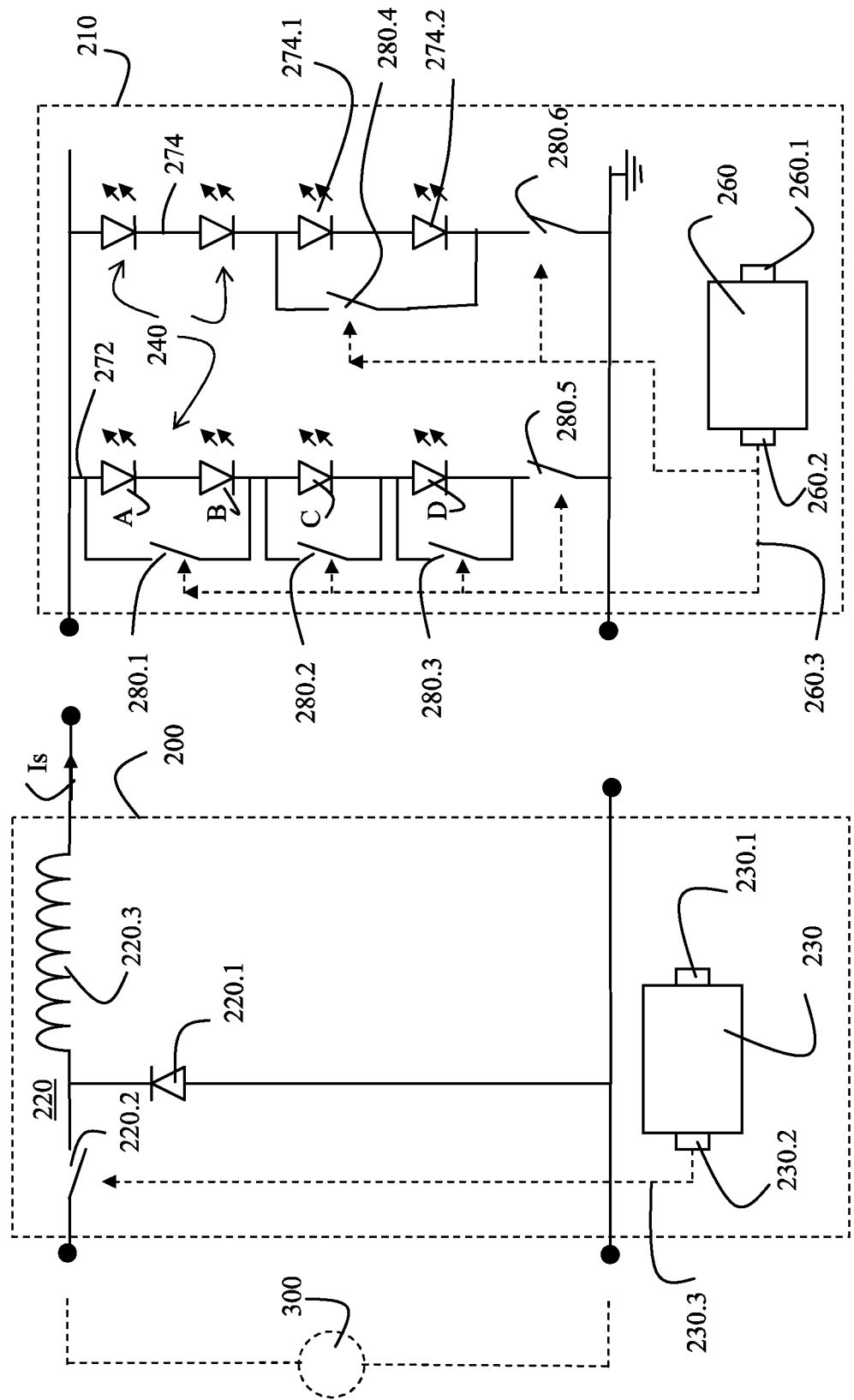
FIG. 1 depicts a combination of an LED driver and a light engine according to a first embodiment of the present invention.

FIG. 1 depicts a modular system according to an embodiment of the present invention. The modular system as schematically shown comprises a first component 200, i.e. an LED driver and a second component 210, i.e. a light engine.

Within the meaning of the present invention, a modular system refers to a combination of components or systems of a lighting application that are typically manufactured as separate items and assembled later on to form the lighting application. Embodiments of the modular systems according to the present invention e.g. comprise LED drivers, light engines and optionally interface modules as such components or items.

Within the meaning of the present invention, light engine refers to an LED assembly comprising a plurality of LEDs. In an embodiment, some or all of the LEDs of the LED assembly are arranged in groups forming LED groups. In an embodiment, each of the LEDs or LED groups is accessible via a terminal of the light engine, 'being accessible' referring to the light engine being connectable to an LED driver or interface module, in order to supply a power to the LEDs or LED groups. In an embodiment, a light engine refers to a combination of an LED assembly and associated switches, the switches being configured to control a current through the LEDs of the LED assembly. In general, the LED assembly may comprise a plurality of LEDs arranged in a variety of topologies. Further, the topology of the LEDs of the LED assembly may also be adjustable by means of switches, thereby e.g. changing a topology of two LEDs connected in series to a topology whereby the LEDs are connected in parallel.

In accordance with an embodiment of the present invention, a light engine may further comprise a control unit or controller for controlling an operating state of the switches of the light engine. Such a control unit or controller may e.g. be embodies as a processor such as a microprocessor or the like.

Within the meaning of the present invention, an LED driver comprises one or more switched mode power converters (SMPC) and a control unit for controlling the one or more switched mode power converters, in particular for controlling a switch, but not limited to, of the switched mode power converter or converters.

In the embodiment as shown, the LED driver 200 comprises a switched mode power converter (SMPC) 220 and a first control unit 230 for controlling the switched mode power converter (SMPC).

In accordance with the present invention, various switched mode power converters may be applied such as Buck, Boost, Buck-Boost or hysteretic converters. In the embodiment as shown, the SMPC is a Buck converter 220 including a diode 220.1 a power switch 220.2 and an energy storage element 220.3, i.e. an inductance. Typically, such converters comprise a switch such as switch 220.2 as shown, for controlling an output current Is as supplied by the SMPC. In an embodiment, the SMPC 220 may e.g. be powered via a rectified DC supply voltage 300. In the embodiment as shown, the light engine 210 is a separate component comprising an LED assembly 240, a plurality of switches 250 for controlling whether or not a current flows through the LEDs and a control unit 260 for controlling the switches. In the embodiment as shown, the LEDs of the LED assembly 240 are arranged in two parallel branches 272, 274. The first branch 272 comprises three groups (group 1 comprising LEDs A and B, group 2 comprising LED C and group 3 comprising LED D) that are arranged in series, each group further having an associated switch 280.1, 280.2, 280.3 for controlling the current through the LED group. The LED assembly further comprises a second branch 274 comprising 4 LEDs, whereby LEDs 274.1 and 274.2 can be shorted by switch 280.4. Switches 280.5 and 280.6 control whether or not a current can be supplied to the respective branches 272 and 274.

In accordance with an aspect of the present invention, the controlling of the SMPC, i.e. the power converter 220 of the LED driver 200 and of the switches 280.1-280.6 as applied in the light engine 210 is performed by separate control units.

Within the meaning of the present invention, a control unit or controller may e.g. be embodied as a microprocessor or processor or any other type of control circuitry. In general, such a control unit may comprise an input terminal 230.1, 260.1 for receiving command signals such as a user defined illumination set point, i.e. an input signal (e.g. provided via a user interface) representing a desired illumination characteristic of the LED assembly. In an embodiment, such a desired illumination characteristic may e.g. include a desired intensity and a desired colour of the light as generated by the LED assembly of the light engine or a certain ratio between the intensities or colours of multiple channels or branches, or a dynamic sequence of such ratios, e.g. resulting in a light show. A control unit or controller may further comprise a processing unit for processing the commands or input signals and e.g. a memory unit for storage of data. A control unit or controller further typically has one or more output terminals 230.2, 260.2 for outputting control signals, e.g. for controlling an electronic switch of the SMPC (indicated by the dotted line 230.3) or controlling a switch of the light engine (indicated by the dotted line 260.3).

In a system as schematically shown in FIG. 1, a desired illumination characteristic to be emitted by the LEDs of the LED assembly 240 can be realized as follows:

In order to realize a desired illumination characteristic, e.g. a particular colour at a particular intensity, the current as provided by the SMPC 220 can be modulated, i.e. the amplitude can be adjusted and the duty cycle of the current through the different LEDs or LED groups of the LED assembly can be adjusted, by switching of the switches 280.1 to 280.6.

In such embodiment, the control unit 230 thus controls the SMPC 220, thereby controlling the amplitude of the supply current Is as provided by the LED driver to the light engine, whereas the control unit 260 may be configured to control the switches 280.1 to 280.6.

In such a modular system as schematically shown in FIG. 1, a variety of control strategies may be implemented.

As a first example, in an embodiment of the present invention, the second control unit 260 may act as the master control unit. In such embodiment, the second control unit 260 may e.g. receive at an input terminal, e.g. terminal 260.1, a set point representing a desired illumination characteristic.

As a second example, in an embodiment of the present invention, the first control unit 230 may act as the master control unit. In such embodiment, the first control unit 230 may e.g. receive at an input terminal, e.g. terminal 230.1, a set point representing a desired illumination characteristic.

As a third example, in an embodiment of the present invention, the system may comprise a separate master control unit (not shown) that is configured to receive, a set point representing a desired illumination characteristic and, upon receipt of such a set point, process the set point and output commands to both the first and second control units, e.g. to the respective input terminals 230.1 and 260.1 of the first and second control units 230, 260.

Regarding the third example, it may further be mentioned that, in an embodiment, either the first or second control unit could be implemented as part of the master control unit or the master control unit could be implemented as a part or component of either the LED driver or the light engine.

As a fourth example, the first and second control units may have been designed to inter-operate such that they jointly execute an algorithm defining the desired operations of the LED driver, in particular of the SMPC of the LED driver, and the LED assembly, in particular of the switches of the LED assembly, each control unit thus having a different but mutually complimentary role.

In an embodiment of the present invention, the desired illumination characteristic is realized by appropriate switching and control of the current during a time interval or time window referred to as the modulation time window. In an embodiment, the modulation time window is an interval, a particular period during which all required switching actions and amplitude modulations of the current of the SNIPS can be grouped, in order to realize the desired illumination characteristic. Phrased differently, the average intensity of the LEDs of the LED assembly during the modulation time window is such that it corresponds to the desired intensity; the same holds for the desired colour as indicated by the desired illumination characteristic. By selecting the modulation time window sufficiently small, an observer will not notice the actual modulation of the current or the switching of different LEDs or LED groups during the modulation time window. In such embodiment, the switching operations as performed during the modulation time window are consecutively repeated until a new desired illumination set point or characteristic is desired. Note that, in case of a light show or a particular lighting effect that includes a gradual, substantially continuous change in an intensity and/or a colour of the generated illumination, a required intensity or colour change may be accommodated within the modulation time window as well.

In an embodiment, the implementation of the required control of the SMPC and of the switches of the LED assembly can be as follows:

In a first step, a set point or command representing a desired illumination characteristic is received by the control unit acting as master control unit, i.e. either the first or second control unit or a dedicated master control unit.

Upon receipt of the set point or command, the control unit acting as master control unit may be configured to determine, based on the desired illumination characteristic, a current amplitude modulation scheme, also referred to as current modulation scheme or current scheme, and a duty cycle modulation scheme.

In accordance with an embodiment of the present invention, the current amplitude modulation scheme represents the amplitude of the current as supplied by the SMPC as a function of time and the duty cycle modulation scheme represents the required switching operations for the switches of the LED assembly. Note that, in an embodiment, the current amplitude modulation scheme may consist of a sequence of non-zero current values to be supplied by the SMPC, see e.g. FIG. 2 below. However, in an embodiment, the switched mode power converter as applied in an LED driver as applied in the present invention, may be operated in a pulsed mode as well, whereby the current as supplied may be zero for a percentage of the time. Such an operation of the SMPC may e.g. be referred to as pulse modulation and may be advantageously applied in case a comparatively low intensity of light is desired. In such case, e.g. where an intensity of less than 50% of the nominal intensity is required, it may be advantageous the 'shut down' the SMPC for half the time rather than maintaining the current towards the light engine and applying a duty cycle of less than 50% to the LEDs of the LED assembly.

Figure 2:
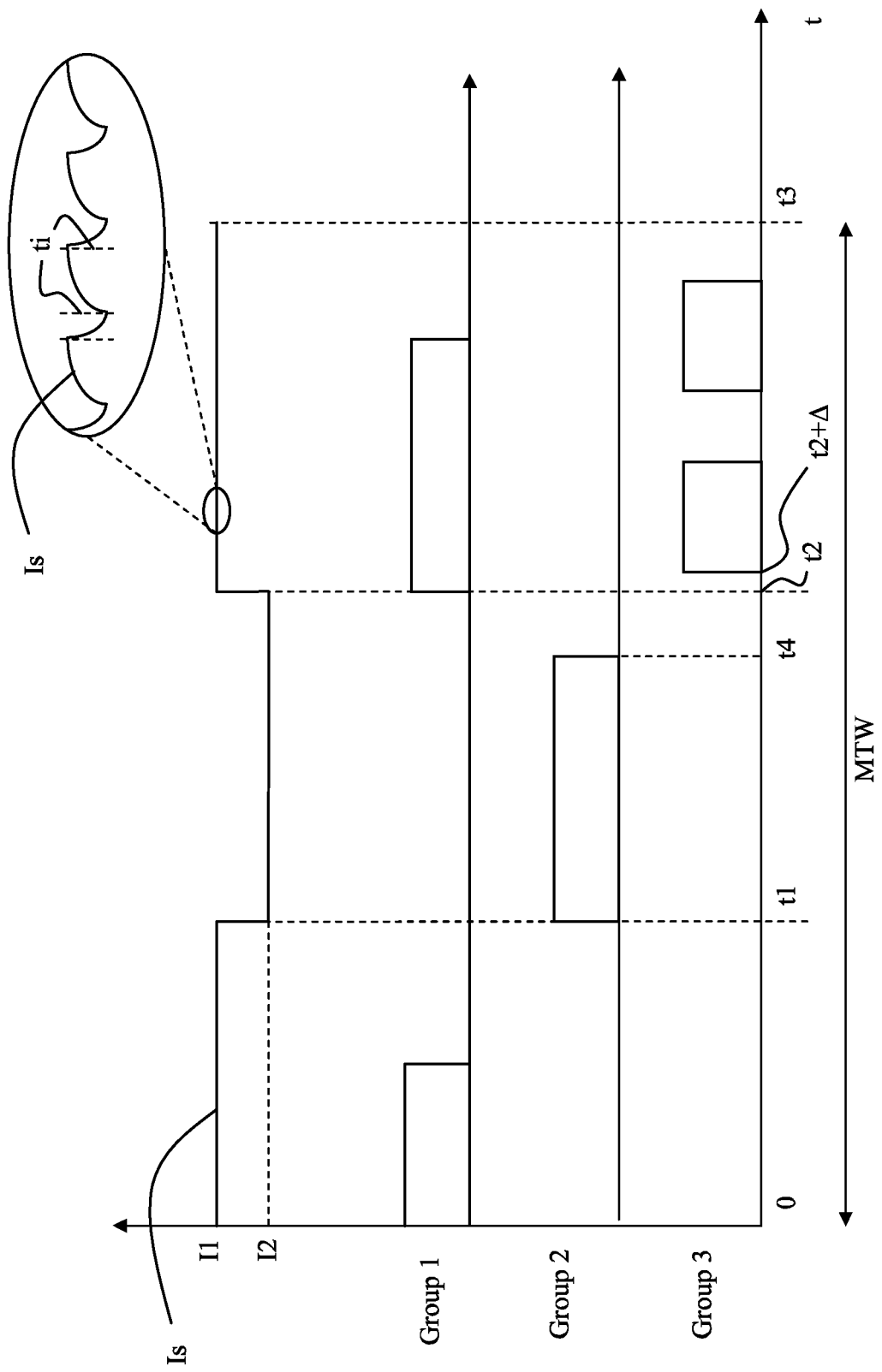
FIG. 2 depicts a current amplitude modulation scheme and duty cycle modulation schemes as can be applied in an embodiment of the present invention.

FIG. 2 schematically shows a possible current amplitude modulation scheme (also referred to as current modulation scheme or current scheme) and corresponding duty cycle modulation schemes for the three groups of the branch 272 of FIG. 1, the schemes indicating amplitude modulations of the current Is as supplied and the required switching operations of the three groups of LEDs of the branch 272 during a modulation time window MTW.

Within the meaning of the present invention, a modulation of a current may also refer to redirecting a current to a different LED or LED group, as will be explained in more detail below.

FIG. 2 schematically shows the switching operations of the parallel switches over the groups as indicated above. It is further assumed that the switch 280.5 is kept closed.

As can be seen in the upper graph of FIG. 2, (indicating the supply current Is as provided by the SMPC), the required current is at a value I1 during intervals 0 to t1 and t2 to t3, whereas the required current is at a value I2 during the interval t1 to t2.

The three other graphs indicated by reference to the groups 1, 2, and 3, indicate whether or not the respective switches of the groups (switches 280.1, 280.2 and 280.3) should be open or closed, whereby a non-zero may e.g. indicate that the switch should be open, a zero value of the graph indicating that the switch should be closed. As such, in accordance with the graph for group 2, one can see that switch 280.2 is only open during the interval t1 to t4, during which interval the SMPC provides in a current with amplitude I2.

By determining, based on a desired illumination characteristic that is to be generated by the LED assembly, a current modulation scheme and duty cycle modulation scheme as e.g. shown in FIG. 2, particular requirements or constraints of the different LEDs as applied or the different topologies as applied, may be taken into account more easily.

In the example given, it may e.g. be that the LED C of group 2 may only be supplied with a current of amplitude I2, rather than a current I1. As another example, one could e.g. consider that LEDs A and B would be connected in parallel rather than in series; in such a situation, the current during the interval 0 to t1 could even be allowed to be higher than I1 (assuming I1 being the nominal current of LEDs A, B and D), because, in the example shown, LEDs C and D are not on during this interval.

By distribution the processing or control power over the light engine and the LED driver, as e.g. done in an embodiment of the present invention, control of an LED assembly of a light engine is facilitated. In particular, by providing a control unit (such as control unit 260) 'on-board' of a light engine, the processing of a command representing a desired illumination characteristic can be performed at least partly by the on-board control unit, said control unit having knowledge of the LED assembly it is connected to. In such an arrangement, the control unit of the light engine may determine the desired current modulation scheme and switching operations of available switches on the light engine, thereby taking into account any particulars, such as physical constraints or topologies of the LED assembly. By incorporation this information in the control unit of the light engine (e.g. in a memory unit of such a control unit), this information need not be shared or known to the LED driver that is used to power the light engine. In such an arrangement, the LED driver need not have any particular knowledge about any constraints imposed by the LED assembly as it is merely required, in an embodiment, to follow instructions as received by the control unit of the light engine. In particular, in such an embodiment, when the current amplitude modulation scheme is determined, e.g. by the control unit of the light engine or a separate master control unit, this control unit may provide the current amplitude modulation scheme to the control unit of the LED driver, e.g. in the form of a desired current set point, as a function of time. As such, the control unit of the LED driver may thus act as a slave in a master-slave configuration with the control unit of the light engine and modulate the current as outputted as indicated by the upper graph of FIG. 2, i.e. during the modulation time window.

As will be understood by the skilled person, the switching pattern and current modulation pattern as indicated by the current amplitude modulation scheme and the duty cycle schemes is subsequently repeated until a control unit of the system receives another illumination set point, which may then give rise to different current modulation and switching schemes.

In an embodiment of the present invention, amplitude modulations of the current amplitude modulation scheme and switching operations of the duty cycle modulation scheme are non-overlapping.

In this respect, it may be pointed out that, as will be understood by the skilled person, LED driver as applied in the present invention may e.g. be equipped to generate more than one output current Is. In particular, LED drivers as applied in the present invention may e.g. be equipped with multiple power converters, each configured to generate or output, at an output channel or terminal of the LED driver, a controllable current. In such embodiment, each SMPC may be controlled by a dedicated control unit, or a common control unit may be provided, controlling the operation of the multiple SMPCs. Such an embodiment of an LED driver may e.g. be advantageously combined with a light engine having multiple channels. In an embodiment, such multiple channels may be construed as multiple parallel branches, as e.g. done in FIG. 1. However, as an alternative, each branch of multiple parallel branches may have its own input terminal to receive a supply current such as the supply current Is as shown in FIG. 1. As an example, an LED driver may thus have two output terminals outputting currents with a different value, the output terminals being connected or connectable to two input terminals connected or connectable to two different branches of LEDs. It may further be pointed out that in such an arrangement, whereby multiple output or supply currents are available and connectable to multiple input terminals, one or more switches may be provided to selectively connect the available branches of LEDs to the input terminals. As such, the connection of the LED branches, when available, to the multiple input terminals may be varied in time as well. As such, an LED or LED branch may be connected to a first channel of the LED driver at a particular instant or period in time and to a second, different channel at another instant or period in time. By doing so, intensity or color modulations may be realized as well.

In the embodiment as illustrated in FIG. 2, one can see that on t=t1, the current Is is modulated, i.e. changed from a value I1 to a value I2. At the same time, switch 280.2, associated with group 2, is switched to an open state. As will be understood by the skilled person, the current as supplied or outputted by an SMPC will not change instantaneously from a value I1 to a different value I2. Rather, there will be a transient in the current profile before the current is at the new set point value. During this transient, there is an uncertainty about the actual value of the current, rendering it difficult to determine the required switching or duty cycling of the switches of the light engine. in order to avoid this uncertainty, in an embodiment, the current modulations and switching operations are separated in time. In FIG. 2, this is e.g. illustrated by the switching operation of group 3 (bottom graph of FIG. 2). As can be seen, switch 280.3 associated with group 3 is switched to an open state (thus allowing the supply current Is to flow through the LED D) at t=t2+Δ, rather than at t=t2, when the current is changed from a value I2 to a value I1. Using such a delay Δ, one can ensure that the transient behaviour associated with a current modulation is over and that the current is at the actual expected value (e.g. I1), when the switch is operated. By means of the delay Δ, one can thus ensure that the switching actions of the switches associated with the LEDs or LED groups of the LED assembly are arranged to occur at instants in time that are different from the instants at which the supply current of the SMPC is adjusted.

In this respect, it can be pointed out that in case the LED driver, in particular the SMPC of the LED driver also performs a pulse modulation, i.e. the output current Is is not continuous but pulsed, similar delays may be adequately applied with respect to the pulsed current as outputted by the SMPC. With respect to the pulsed mode operation of the SMPC, it may be pointed out that and additional switch may be provided in the SMPC to turn off (in a pulsed mode) the SMPC.

In an embodiment of the present invention, the first and second control unit are configured to synchronize a switching operation of a switch of the switched mode power converter (SMPC) with a switching operation of one or more of the switches of the light engine. Due to the switching operation of the SMPC (e.g. by switching the switch 220.2 of the SMPC 220 as shown in FIG. 1), the output current Is of an SMPC will not be constant but will have a saw-tooth profile, as illustrated in the detail 400 of the current Is. In the detail 400, instants ti indicate switching instants of the switch 220.2, said switching causing the current slope to reverse, i.e. from an increasing current to a decreasing current and vice-versa).

By synchronizing the switching operations of the switches of the light engine, as e.g. indicated by the duty cycle schemes shown in FIG. 2, with the switching instants ti of the SMPC, a more accurate correspondence between the actual illumination characteristic and the desired characteristic can be achieved. In addition, parasitic disturbances such as flicker may be mitigated by synchronizing these instants. In order to realize such a synchronization, various options exist.

In an embodiment, the control units of the LED driver and of the light engine as applied in the modular system according to the present invention, may e.g. in an embodiment, be provided with a common clock signal to synchronize operations.

Figure 3:
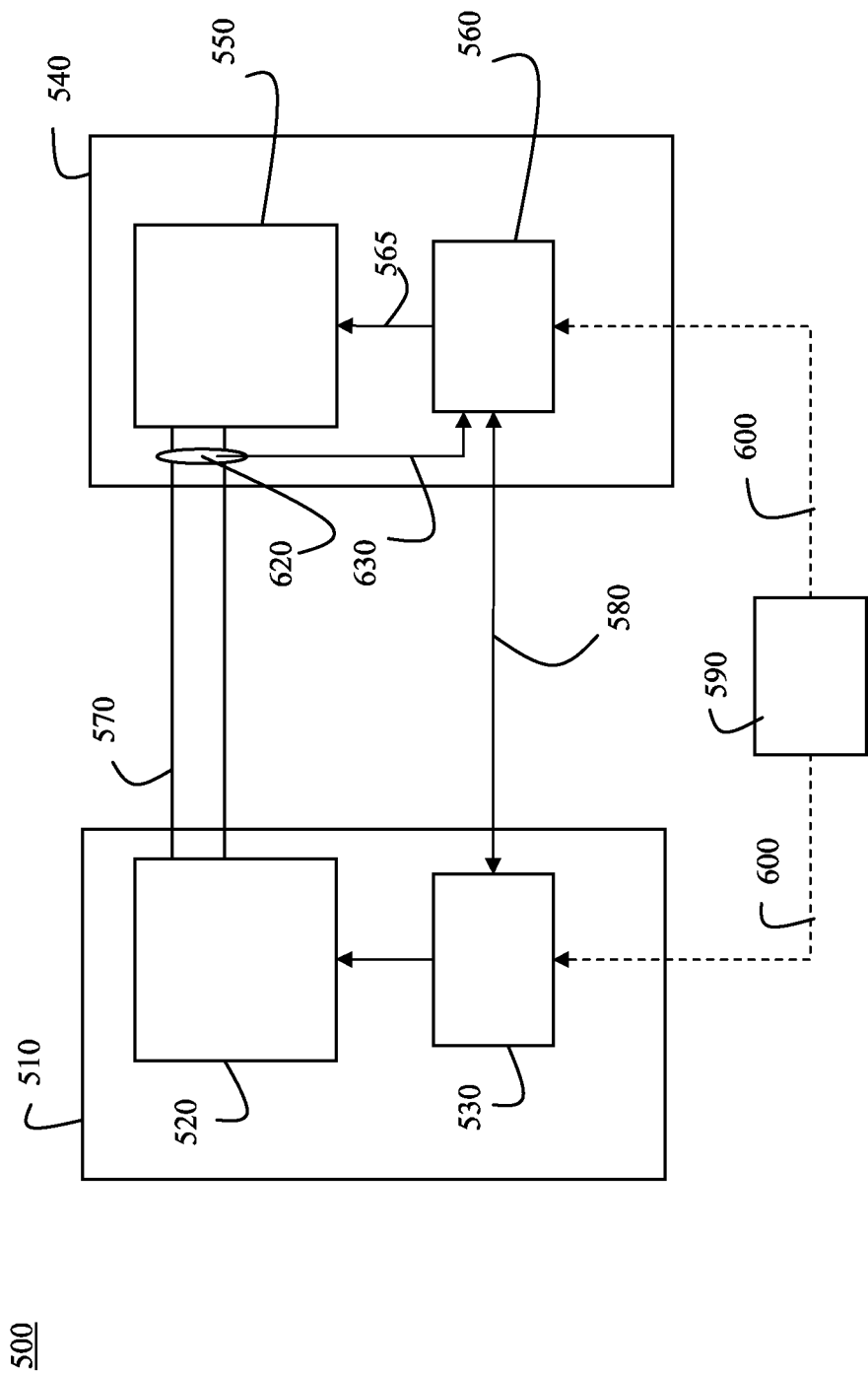
FIG. 3 depicts a modular system according to a second embodiment of the present invention.

FIG. 3 schematically shows a general set up of a modular system 500 according to the present invention wherein various options for synchronization are illustrated. The modular system 500 as shown comprises an LED driver 510 comprising a switched mode power converter (SMPC) 520 and a control unit 530 (e.g. a microprocessor or microcontroller or the like) for controlling the SMPC, e.g. by means of a control signal 535. The system 500 further comprises a light engine 540 comprising an LED assembly 550 (comprising a plurality of LED, e.g. arranged in groups and one or more switches for controlling the currents through the LEDs or groups of LEDs of the LED assembly) and a control unit 560 for controlling the switches of the LED assembly 550, e.g. by means of a control signal 565. In embodiment as shown, lines 570 represent the power supply as provided by the SMPC to the light engine. Line 580 indicates a communication channel between the control unit 530 of the LED driver and the control unit 560 of the light engine.

In the embodiment as shown, the system further comprises a master control unit 590 which may e.g. be configured to provide a synchronization signal 600 (e.g. a clock signal) to both the control units 530 and 560 to synchronize the switching. In such embodiment, the control units of the LED driver and the light engine may thus make use of a common clock signal that is provided by the master control unit 590. Alternatively, either the control unit of the LED driver or the control unit of the light engine may provide a synchronization signal to the other control unit, in order to synchronize operations. This can e.g. be realized via the communication channel 580. Communication channel 580 can be any suitable communication channel, either wired or wireless for exchanging data or commands between the control units 530 and 560. The communication channel may be bi-directional or uni-directional, depending on the manner in which both control units co-operate. The communication channel may be of a hybrid form in conveying both analogue waveforms to e.g. signal events or to convey values or may exhibit digitally interpretable waveforms to convey commands, status and data in digital form or any suitable combination of those. The communication channel can be synchronous, asynchronous, non-deterministic, deterministic, real-time or non-real time.

As an alternative to synchronizing via a common synchronization signal or clock signal, the light engine may e.g. be configured to detect the switching instants ti of the switch of the SMPC. In FIG. 3, 620 represents a measurement unit configured to measure the current as supplied by the SMPC and provide a signal 630 representative of the current to the control unit 560 of the light engine. based on such a signal, the control unit 560 may e.g. be configured to derive the switching instants (instants ti as e.g. indicated in FIG. 2) of the SMPC and synchronize the switching of the switches of the light engine to these instants.

In an embodiment of the present invention, the synchronisation of switching operations or current modulations with modulations occurring in an LED driver may by realised by means of communication messages over a bus or communication channel to which the control units of the LED driver, the light engine and/or the interface module (see further on) are connected. Alternatively, or in addition, communication over the power lines connecting the LED driver and the light engine or interface module may be considered as well. In such an arrangement, a control unit of the LED driver may e.g. send a message of an event in the LED driver to the control unit of the light engine or the interface module. The control unit of the interface module or light engine may then measure the time of arrival of the message and measure the time between the arrival of the message and the occurrence of an event in the light engine or interface module. As such, delays in the modular system can be identified and used to synchronise operations, e.g. by intentionally introducing delay or unique patterns in sending control signals. In this respect, reference can e.g. be made to clock synchronisation as applied in networks.

In an embodiment as described above, the control unit of the light engine was configured to determine, based on a receive set point representing a desired illumination characteristic, a current amplitude modulation scheme and a duty cycle modulation scheme. In such an arrangement, the control unit of the light engine can be considered the master whereas the control unit of the LED driver acts as slave, following commands of the control unit of the light engine, e.g. received via a communication channel such as communication channel 580 as shown in FIG. 3.

In an alternative embodiment, the control unit of the LED driver, e.g. control unit 230 or control unit 530 acts as master control unit. In such embodiment, the control unit of the LED driver may e.g. be configured to:

receive, at an input terminal of the control unit, LED assembly information describing the LED assembly to be powered and receive, at the input terminal, a set point representing a desired illumination characteristic to be generated, during use, by the LED assembly.

As will be clear to the skilled person, in a modular system whereby the LED driver and light engine are combined, the LED driver may require information about the light engine that needs to be powered. In accordance with the embodiment of the present invention, the control unit of the LED driver may therefore be configured to receive such information. In particular, such LED assembly information may e.g. describe the topology or layout of the LED assembly of the light engine that needs to be powered, e.g. including technical data such as voltage or current requirements of the different LED of the LED assembly, descriptive data indicating how the LEDs are connected and optionally grouped, descriptive data about the available switches and the manner in which they control the current through certain LEDs or LED groups of the LED assembly (e.g. switches connected in series or in parallel).

In accordance with the embodiment of the present invention, the control unit of the LED driver may then be configured to determine, based on the received set point and the LED assembly information, a current amplitude modulation scheme and a duty cycle modulation scheme, in a similar manner as described above.

In such an arrangement, whereby the LED driver, in particular the control unit of the LED driver, acts as master, may provide a control signal to the control unit of the light engine, the control signal representing the required duty cycle modulation scheme to be executed by the light engine. In such an embodiment, the LED driver may further communicate certain events to the light engine, e.g. for the purpose of synchronization. As an example, the LED driver may e.g. communicate the occurrence of switching instants of the SMPC of the LED driver to the light engine or the start of a modulation time window as described in FIG. 2.

As an alternative to the use of the communication channel 580 as shown in FIG. 3, any required communication between the LED driver and the light engine may also be realized by means of power line communication or the like, whereby the power lines, e.g. power lines 570, are used for communicating data or commands between the LED driver and the light engine. Such power line communication may e.g. include the use of positive or negative voltage or current pulses or spikes on the power lines By using a master-slave setup for the control units of the LED driver and the light engine, as e.g. discussed above, the communication between the LED driver and the light engine may be kept to a minimum, since only a current set points may need to be communicated, in an embodiment of the present invention.

In an embodiment, the modulation time window is considered to comprise sub-windows, one sub-window per group of LEDs that is controllable by a particular switch, whereby the switching of the particular switch only occurs in one of the sub-windows. In an embodiment, the sub-windows are non-overlapping. In this respect, reference may e.g. be made to US 2012/0235589, incorporated herein by reference in its entirety.

In an embodiment, an LED driver may e.g. be configured to supply a current to multiple LEDs or LED groups of a light engine during a modulation time window comprising a respective multiple sub-windows, whereby, during each sub-window, only one LED or LED group is supplied with the current.

Figure 4:
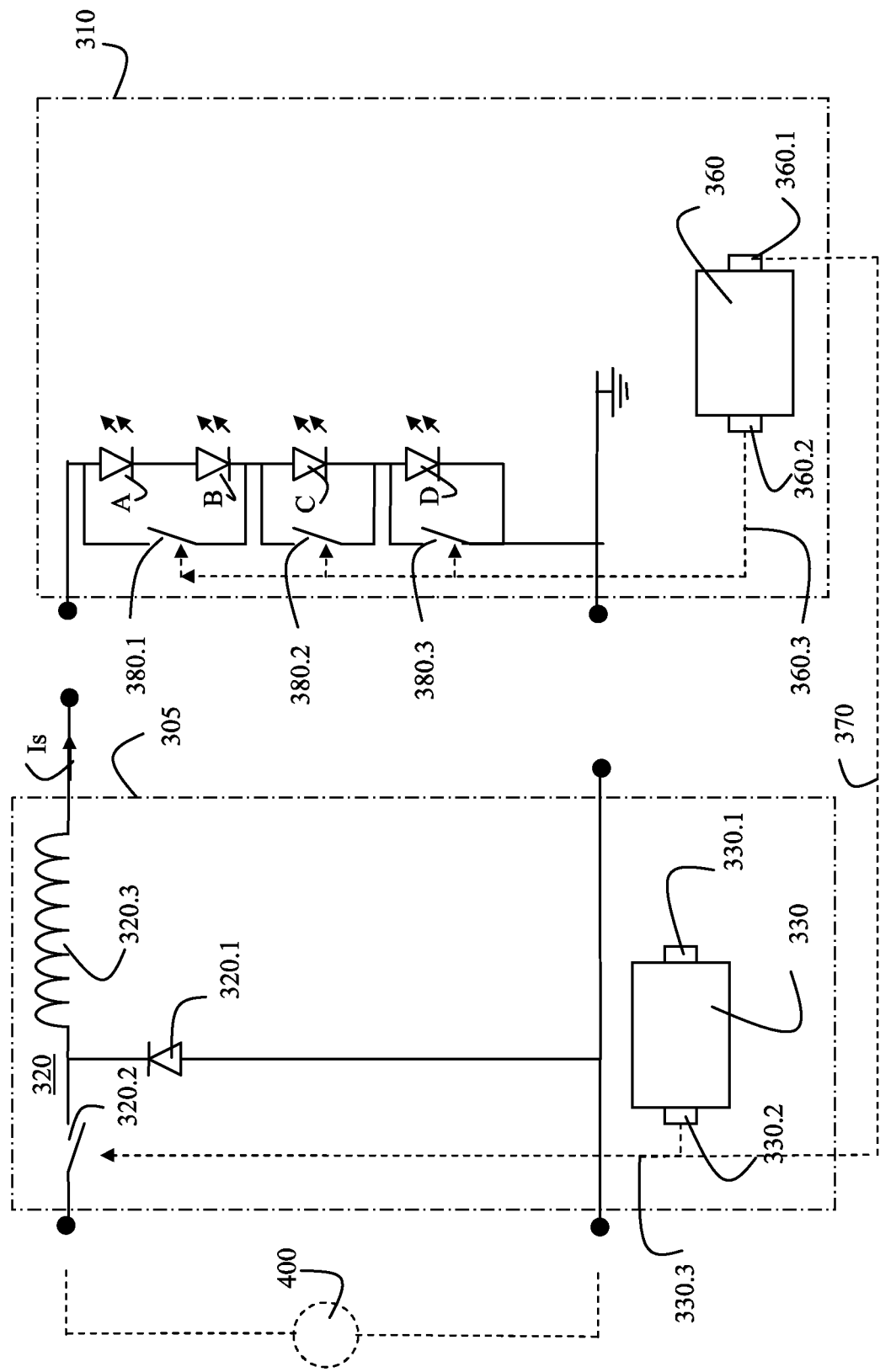
FIG. 4 depicts a combination of an LED driver and a light engine according to a third embodiment of the present invention.

A modular system according to the present invention, enabling such operation is schematically shown in FIG. 4. In the embodiment as shown, the LED driver 305 comprises a switched mode power converter (SMPC) 320 and a first control unit 330 for controlling the switched mode power converter (SMPC).

In accordance with the present invention, various switched mode power converters may be applied such as Buck, Boost, Buck-Boost or hysteretic converters. In the embodiment as shown, the SMPC is a Buck converter 320 including a diode 320.1 a power switch 320.2 and an energy storage element 320.3, i.e. an inductance. Typically, such converters comprise a switch such as switch 320.2 as shown, for controlling an output current Is as supplied by the SMPC. In an embodiment, the SMPC 320 may e.g. be powered via a rectified DC supply voltage 400. In an embodiment, the switch may be controlled by the first control unit 330, e.g. based on a current measurement performed by the light engine, e.g. by detecting a voltage across a resistor in series with the LED assembly (not shown).

In the embodiment as shown, the light engine 310 is a separate component comprising an LED assembly comprising multiple LEDs or LED groups, a plurality of switches for controlling whether or not a current flows through the LEDs and a control unit 260 for controlling the switches. In the embodiment as shown, the LEDs of the LED assembly are arranged in one branch comprising three groups (group 1 comprising LEDs A and B, group 2 comprising LED C and group 3 comprising LED D) that are arranged in series, each group further having an associated switch 380.1, 380.2, 380.3 for controlling the current through the LED group. In accordance with an aspect of the present invention, the controlling of the SMPC, i.e. the power converter 320 of the LED driver 305 and of the switches 380.1-380.3 as applied in the light engine 310 may e.g. be performed by separate control units.

Within the meaning of the present invention, a control unit or controller may e.g. be embodied as a microprocessor or processor or any other type of control circuitry. In general, such a control unit may comprise an input terminal 330.1, 360.1 for receiving command signals such as a user defined illumination set point, i.e. an input signal (e.g. provided via a user interface) representing a desired illumination characteristic of the LED assembly. In an embodiment, such a desired illumination characteristic may e.g. include a desired intensity and a desired color of the light as generated by the LED assembly of the light engine or a certain ratio between the intensities or colors of multiple channels or branches, or a dynamic sequence of such ratios, e.g. resulting in a light show. A control unit or controller may further comprise a processing unit for processing the commands or input signals and e.g. a memory unit for storage of data. A control unit or controller further typically has one or more output terminals 330.2, 360.2 for outputting control signals, e.g. for controlling an electronic switch of the SMPC (indicated by the dotted line 330.3) or controlling a switch of the light engine (indicated by the dotted line 360.3). In the embodiment as shown, a communication channel 370 is further provided connecting the first and second control unit 330, 360. Such a communication channel may e.g. be a bidirectional or unidirectional serial communication channel.

In a system as schematically shown in FIG. 4, a desired illumination characteristic to be emitted by the LEDs of the LED assembly can be realized as follows during a modulation time window, under the assumption that only one of the LEDs or LED groups is on at the same time. Assuming that a set point representing a desired intensity and color is received, e.g. via the input terminal 330.1 of the first control unit 330. Based upon the desired color characteristic and the known characteristics of the LED groups, the first control unit may then determine the appropriate required mixing of the LED group colors in order to arrive at the desired color indicated by the set point. As an example, the desired color may e.g. be realized by having the first group (LEDs A and B) on for 25% of the time, having the second group (LED C) on for 50% of the time and having the third group (LED D) on for 25% of the time. Note that these percentages are determined under the assumption of the same current being provided to the LED groups. Within the meaning of the present invention, these percentages may also be referred to as ratios of the LED groups, indicative of the ON-time of an LED group over the modulation time window.

Once such an assessment is made, a modulation time window may, in an embodiment, be subdivided into different sub-windows having durations or periods proportional to the determined percentages. Such a time-division of the modulation time window may be referred to as a time-division scheme, such a scheme representing the desired or required switching actions required to apply the supply current to the appropriate LED group, during the appropriate period. In an embodiment of the present invention, the desired illumination characteristic is realized by appropriate switching and control of the current during a time interval or time window referred to as the modulation time window. In an embodiment, the modulation time window is an interval, a particular period during which all required switching actions and amplitude modulations of the current of the SMPC can be grouped, in order to realize the desired illumination characteristic. Phrased differently, the average intensity of the LEDs of the LED assembly during the modulation time window is such that it corresponds to the desired intensity; the same holds for the desired color as indicated by the desired illumination characteristic. By selecting the modulation time window sufficiently small, an observer will not notice the actual modulation of the current or the switching of different LEDs or LED groups during the modulation time window.

Figure 5:
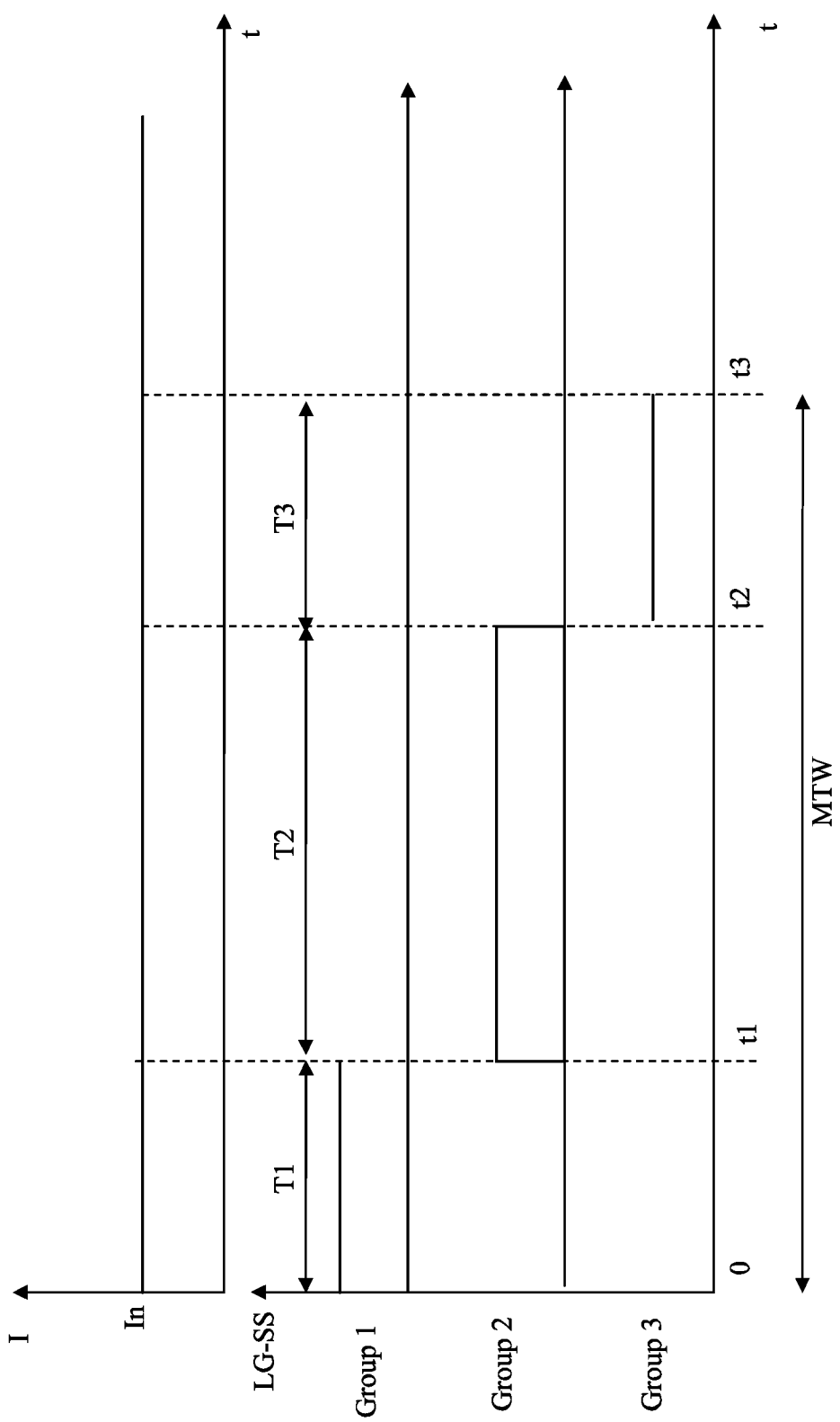
FIG. 5 depicts a time-division scheme as can be applied in an embodiment of the present invention.

FIG. 5 schematically shows the required switching operations of the switches 380.1, 380.2 and 380.3, LG-SS (LED group switching sequence), in order to realise the ratios as indicated for the LED groups, i.e. to subdivide the modulation time window in accordance with a time-division scheme that results in a desired color. In particular, in order to turn on Group 1 of the LEDs during $\frac{1}{4}^{th}$ of the period MTW (the modulation time window), switch 380.1 needs to be open during the period T1 from t=0 to t=t1; in order to turn on Group 2 of the LEDs during $\frac{1}{2}^{th}$ of the period MTW, switch 380.2 needs to be open during the period T2 from t=t1 to t=t2, and, in order to turn on Group 3 of the LEDs during $\frac{1}{4}^{th}$ of the period MTW, switch 380.3 needs to be open during the period T3 from t=t2 to t=t3.

In an embodiment, the control unit 360 of the light engine may e.g. be configured to determine the desired time-division scheme needed to realise the desired color set point. In such embodiment, the first control unit 330 may e.g. communicate the desired color set point to the second control unit 360. Alternatively, the first control unit 330 may determine the desired time-division scheme and communicate it, e.g. via a serial communication channel, e.g. channel 370, to the second control unit 360.

With respect to the desired intensity, e.g. indicated by a set point as received, such a desired intensity can be realised by supplying the appropriate current to the LED assembly of the light engine. In the example as shown in FIG. 5, a current I=In, e.g. the nominal current of the LED driver, is provided to the light engine during the modulation time period.

In this respect, it can be pointed out that, due to the application of the time-division scheme which represents the required sub division of a modulation time window to arrive at a desired color, the current can be maintained at the same level during the entire modulation time window. One could represent such a situation by a current modulation scheme that merely represents a single value, In.

In another embodiment however, the current as supplied during each sub-window may be changed as well. As an example, the applied supply current may be different in each sub-window. In addition, current modulations, e.g. duty cycling may be applied within one or more sub-windows. As such, each sub-window may further be subdivided into different sub-sub-windows, during which a particular current modulation may be applied.

In case the intensity of the generated light is to be reduced, while maintaining the color set point, the current as generated by the LED driver, e.g. LED driver 305, can be reduced. Alternatively, or in addition, the current as supplied by the LED driver could be modulated. By performing the duty cycle modulation by the switch of the LED driver, the complexity of the time-division scheme can be kept low.

Assuming that the intensity of the illumination needs to be reduced to 50% and assuming a linear relationship between the intensity and the supply current I, such a dimming set point can be realised by either reducing the current to 50% of the nominal current In or by applying a duty cycle of 50% during each of the periods T1, T2, T3.

In the latter case, in accordance with an embodiment of the present invention, the duty cycling may be realised by appropriate switching of the power switch 320.2 of the LED driver 305. In this respect, it can be pointed out that, when a very low intensity is required, e.g. lower that an intensity corresponding to a lowest current value that can be realised by the LED driver, the application of duty cycling of the power switch of the LED driver may enable to realise this.

Figure 6:
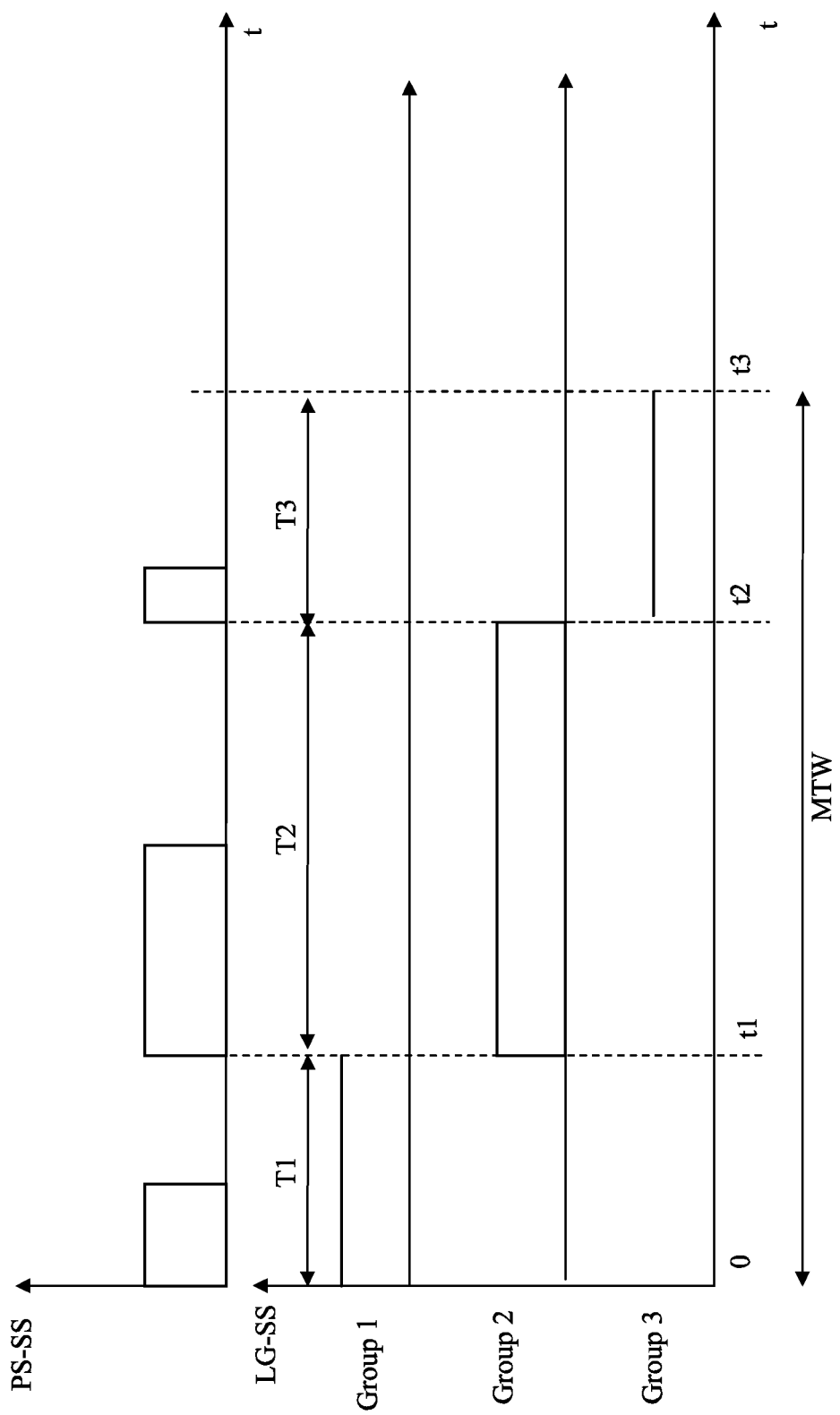
FIGS. 6-8 depict duty-cycle modulation schemes and corresponding time-division schemes as can be applied in an embodiment of the present invention.

FIG. 6 schematically shows a possible switching sequence, or duty cycle modulation scheme, of the power switch 320.2, PS-SS, illustrating that a supply current is provided by the LED driver during a first half of the period Ti, during a first half of the second period T2 and during a first quarter of the third period T3. Assuming that the supply current in the depicted situation corresponds to the lowest available current of the LED driver, the duty cycling of the power switch enables to obtain even lower illumination set points.

Note that, in the embodiment as shown, the switches of the light engine, i.e. switches 380.1-380.3 are merely applied to ensure that the current supplied by the LED driver is applied to the appropriate LED group, whereas the control of the current, both with respect to amplitude and duty cycle, is performed by the LED driver.

Note that, in addition to performing a duty cycling using the power switch 320.2, and additional duty cycling using the switches 380.1-380.3 could be considered as well, in a similar manner as illustrated in FIG. 2.

Figure 7:
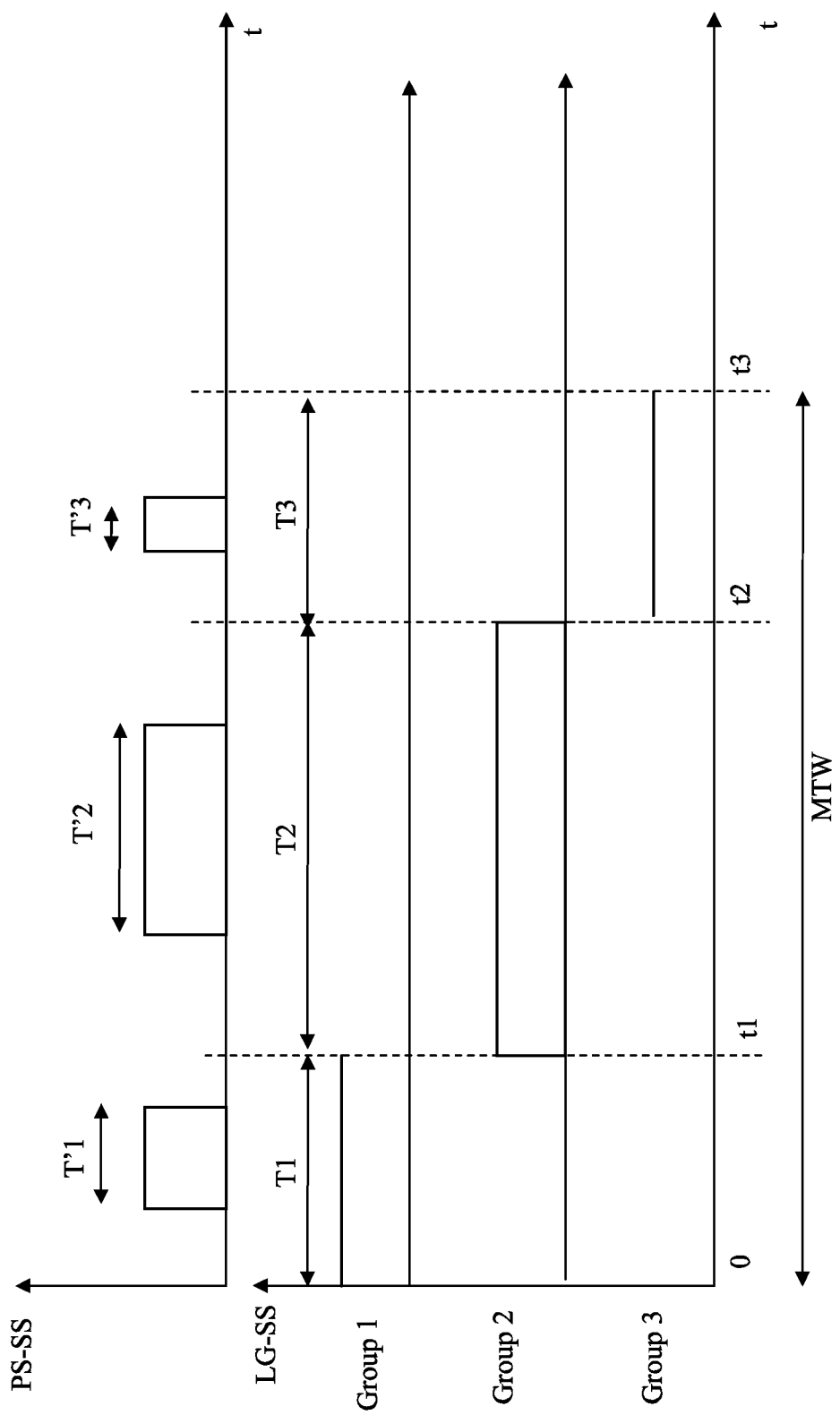

With respect to the switching schemes as schematically pointed out in FIG. 6, it can be pointed out that it may be advantageous to ensure that the switching instants of the power switch of the LED driver do not coincide with switching instants of the light engine or the switch assembly of the light engine. FIG. 7 schematically shows switching schemes for the LED driver (PS-SS) and for the light engine (LG-SS) having such different switching instants.

Note that with respect to generation of a desired color and intensity, the light engine switching instants t1, t2 and t3 merely provide in a subdivision of the modulation time window into three periods during which the current is supplied to one of three LEDs or LED groups; the color and intensity being determined by the periods T'1, T'2 and T'3 and the supplied current.

Figure 8:
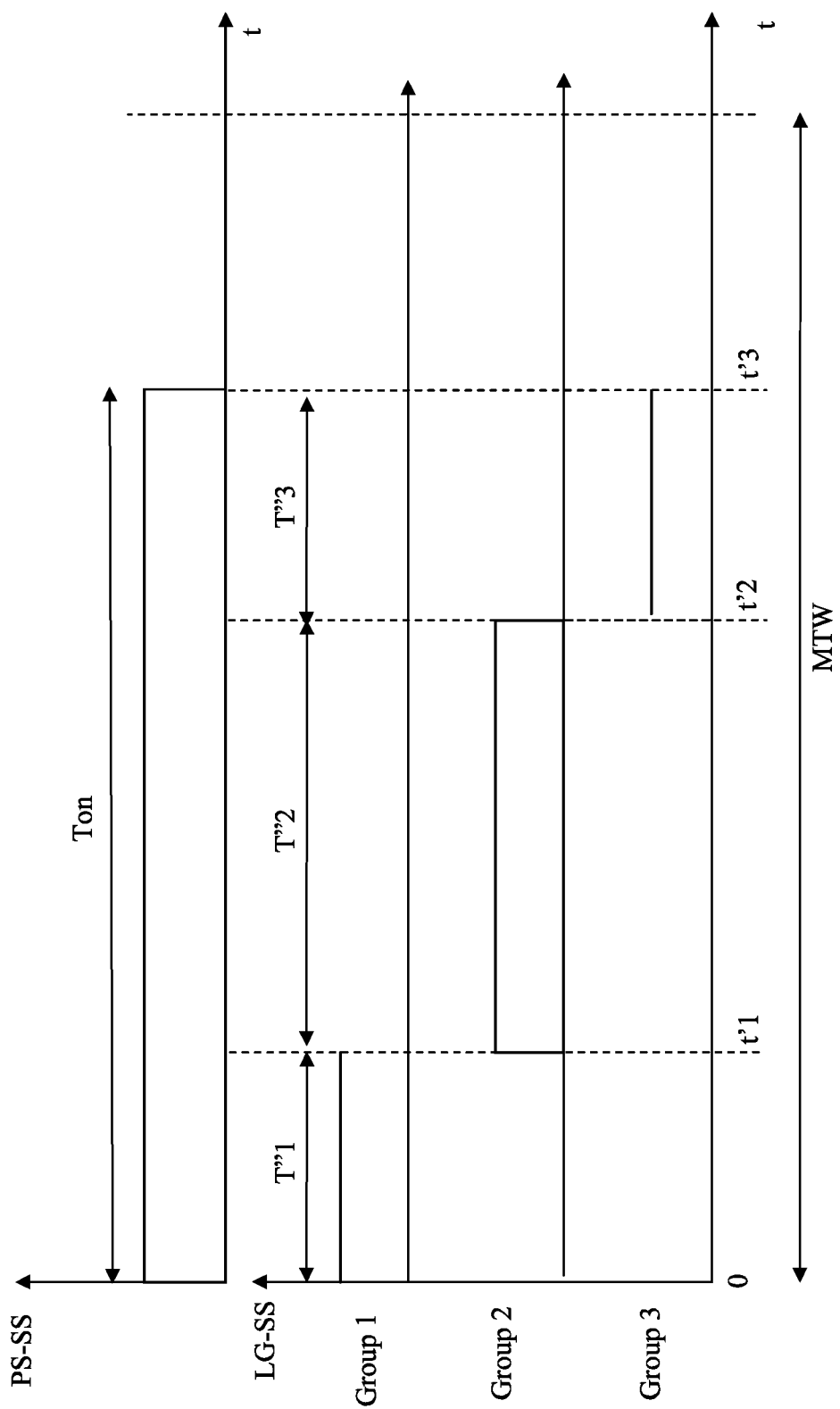

In addition to the modulation schemes as shown in FIGS. 5, 6 and 7, FIG. 8 schematically shows yet another manner of controlling both an intensity and color using three LEDs or LED groups (Group 1, Group 2, Group 3); FIG. 8 schematically shows a switching sequence PS-SS for an LED driver whereby the LED driver outputs a nominal current In during only 75% of the modulation time window. In order to provide in the appropriate color, which is determined by the ON-time of the different LEDs or LED groups relative to each other, the period Ton during which the current is on (i.e. 75% of the modulation time window) is subdivided into three periods T"1, T"2 and T"3 during which the respective groups 1, 2 and 3 are supplied with the LED driver current. This can be done by switching the current at instants t'1, t'2 and t'3. One could consider that the switching schedule LG-SS as shown in FIG. 5 is in fact compressed into a time window equal to 0.75*MTW.

It can be noted that the switching schemes as schematically shown in FIGS. 5, 6, 7 and 8 can be considered different operating modes to control an LED driver and light engine or interface module.

The operating mode represented by the switching scheme as illustrated in FIG. 5 may e.g. be referred as a continuous current mode, since a continuous current is applied throughout the modulation time window.

The operating mode represented by the switching scheme as illustrated in FIG. 8 may e.g. be referred as a compressed current mode, since the required light engine modulations (LG-SS) are performed in a portion of the modulation time window, the current being zero outside said portion.

The operating mode represented by the switching scheme as illustrated in FIG. 6 or 7 may e.g. be referred as a duty cycle modes, due to the application of a duty cycling of the LED current.

It can be pointed out that the selection of the operating mode may e.g. be made depending on the desired illumination characteristic.

In an embodiment of the present invention, the operating mode is e.g. selected on a desired dimming level. As an example, a modular system according to the present invention may e.g. be configured to operate in a continuous current mode when a desired dimming level is in a range between 100% and 75%, configured to operate in a compressed current mode when a desired dimming level is in a range between 75% and 25%, and configured to operate in a duty cycle mode when a desired dimming level is below 25%.

It can further be noted that, in addition to the duty cycling of the power switch 320.2 as e.g. shown in the switching scheme PS-SS of FIG. 6, a current modulation of the supply current of the LED driver may be applied as well; in particular, the current I as supplied need not be kept at the same value during the periods T1, T2, T3, the current may e.g. be kept at a first value I1 during a first half of the periods and at a second value I2 during the second half of the periods, thus enabling to obtained a higher resolution with respect to intensity.

In the embodiment as shown in FIGS. 5-8, the modulation time window is subdivided into sub-windows, whereby the duration of the sub-windows is selected to represent a desired color set point. Alternatively, the sub-windows may have a fixed period, e.g. 1/N×MTW, whereby N equals the number of LED groups. Note that, in such an embodiment, the current as supplied during the different sub-windows may need to be modulated, i.e. have different values, in order to arrive at a desired color. This modulation may e.g. include applying different current values during the different sub-windows or applying a different duty cycle during the different sub-windows, or applying a modulated current waveform during the different sub-windows or sub-sub-windows.

As such, in the embodiment as described in FIGS. 5-8, a desired illumination set point may be obtained by determining a time division scheme, indicating a desired switching of the light engine, a duty cycle modulation scheme and/or current modulation scheme, indicating a desired operation of the LED driver to generate the required supply current.

In a similar manner as described w.r.t. FIGS. 1-3, the processing or control power to arrive at the set point may be distributed over the light engine and the LED driver. In particular, in the example given, the control to arrive at the desired time-division scheme may be realised by the control unit 360 of the light engine, whereas the control to arrive at the desired supply current, e.g. represented by the current modulation scheme and/or duty cycle modulation scheme, e.g. modulation scheme PS-SS, may be realised by the control unit 320 of the LED driver. Alternative arrangements whereby the duty-cycle modulation is performed by the light engine or where the light engine may affect the intensity emitted may be considered as well.

A consequence of the distribution of the control power over the control units of the LED driver and the light engine, is that an accurate synchronisation between the control actions of the control units is desired. Note that a synchronisation may be less critical in case one of the first or second control unit acts as a master controlling the other control unit. In such arrangement, the master control unit may e.g. transmit a set point to the slave control unit.

The present invention proposes various ways to arrive at such a synchronisation.

The main objective of the synchronisation of the control actions of the control units applied is to ensure that the illumination as generated by the LED assembly of the light engine substantially matches a desired illumination characteristic, e.g. represented by a set point, e.g. received by either the control unit of the LED driver (230, 330) or the control unit of the light engine (260, 360). In this respect it can be noted that the control actions by the control unit may refer to control signals for controlling the switches in the LED driver, e.g. the switch 220.2 or 320.2 of the SMPC of the LED driver, and/or to control signals for controlling the switches of the light engine, e.g. switches 280.1-280.6 or 380.1-380.3. These control actions result in a modulation of the supply current as provided by the LED driver and a modulation of the current as supplied to the multiple LEDs or LED groups of the LED assembly of the light engine.

Since these actions may be initiated by different control units, a synchronisation is required. More specifically, the overall modulation as applied to the LEDs or LED groups is characterised by a sequence of modulation cycles, e.g. represented above as modulation time windows (MTW), where during each modulation time window, the currents through the LEDs or LED groups is modulated in such manner that, on average, a desired intensity and/or desired color is obtained. During such a modulation time window MTW, the instantaneous current through a particular LED or LED group may vary substantially, in accordance with the applied current modulation scheme, duty cycle modulation scheme or time-division scheme. In addition to the overall, averaged, boundary conditions for the currents as supplied to the LEDs or LED groups, there may be some additional requirements for the instantaneous current, e.g. with respect to the occurrence of flicker or with respect to efficiency of the light engine, the LED driver or the modular system as a whole.

In an embodiment, the modulation time window as applied may further be defined by it being subdivided in periods, referred to as sub-windows, where, during each period, a specific purpose or objective is targeted. A possible purpose is that during such a sub-window, as e.g. illustrated in FIGS. 5-8, a particular LED or LED group is controlled (the LED or LED group e.g. radiating red light) while during the next sub-window another LED or LED group is controlled (that e.g. radiates blue light), and so on. A further purpose of the sub-windows may be to distribute the control of a specific LED group in time such that the frequency content of the applied current modulation for that specific LED group only holds frequencies that are sufficiently high, such that they are not observed in the overall generated illumination by a human or camera.

It may further be noted that the synchronization of the control units of the LED driver and the light engine should not only synchronize the start and stop times of a modulation time window and its periods or sub-windows, which is further on referred to as 'frequency synchronisation', there should also be a correct 'phase relationship' between the applied control actions and schemes in order to ensure that, when a particular objective of the modular system is to be realised during a sub-window, e.g. LED group x is to be supplied with a particular current and duty cycle, the control actions controlling the supply current and the control actions controlling the sub-window are in phase. This synchronisation is further on referred to as 'phase synchronisation'. Without such a synchronisation, a first control unit may e.g. target a purpose that is not in line with actions taken by the second control unit, despite being synchronised with respect to frequency.

To illustrate this, reference can e.g. be made to the duty cycle modulation scheme PS-SS and the time-division scheme FIG. 6. As can be seen, during T3 of the MTW, a current with a duty cycle of 25% is supplied to group 3. It can be pointed out however that the duty cycle of the current is implemented by the LED driver, whereas the enabling of the current through a particular LED or LED group is implemented by the light engine. So, in order to apply the appropriate current to the appropriate LED or LED group, the duty cycle modulation scheme needs to be in phase with the time-division scheme of the groups. If not, e.g. assuming that there is phase difference equal to period T3, the duty cycle modulation scheme intended for group 1 could e.g. be applied to group 3.

Frequency Synchronisation

In accordance with the present invention, a frequency synchronisation may be realised in the following manners:

A first method to realise a frequency synchronisation is to synchronise a modulation clock signal of a first control unit with a modulation clock signal of the second control unit. Within the meaning of the present invention, a modulation clock signal of a control unit refers to a repetitive signal that is used for the synchronisation of actions that are controlled by the control unit, e.g. switching operations or current level adjustments, whereby the modulation clock signal is derived from an internal clock signal of the control unit.

Method 1 may thus be described as a method that enables to synchronise the clock mechanism of both control units on which the modulation relies. The clock mechanism may be considered the mechanism that delivers the modulation clock signal, e.g. an interrupt mechanism delivering a repetitive interrupt signal based on the internal clock signal of the control unit.

As second manner of frequency synchronisation would be to synchronize the start times of the modulation time windows or sub-windows. As the modulation time windows are arranged head to tail, the stop times are thus known as well. Should there be an intermediate time between cycles or periods, then the stop times may need a separate synchronisation which can be implemented using the same method as used for the start times. Note that in general, the modulation cycles or modulation time windows, periods or sub-windows as applied in the present invention may have variable length.

More details on both methods are provided here below:

Method 1:

In an embodiment, the first control unit and the second control unit may be connected by means of a serial communication bus. In an embodiment, each control unit may have a bidirectional or unidirectional communication port for serial communication. As an example, a bidirectional communication port of the first control unit may be connected to a bidirectional communication port of the second control unit in such a way that bidirectional communication is possible (e.g. Tx1-Rx2 and Rx1-Tx2). In general, a serial communication is characterized in that data elements are transmitted consisting of a number of bits. Each bit represents a state on the communication line which is associated with the bit being a logical 1 or a logical 0. The state on the communication line can be a voltage, a differential voltage, a current, a differential current, an impedance, an optical intensity, a color, and so on.

The serial communication may further be characterised in that each bit of the data elements are present on the communication line for a fixed duration referred to as the bit-time or bit-duration. The first control unit may e.g. be a microprocessor or the like, as known in the art and operating based on a clock signal, as also known in the art. The clock signal may be generated external or internal to the first control unit and can be characterized by its nominal frequency, actual frequency, jitter, temperature dependency, and so on. As such, a timing based on such a clock signal will vary from processor specimen to processor specimen, e.g. depending on the temperature.

In order to synchronise the first and second control unit according to the first method, the first control unit may generate, in a first step, a bit stream for the serial communication based on its clock signal whereby a duration or period of one bit, i.e. the bit-time or bit-duration, is a large multiple of one period of the clock signal. In practice this multiple may be in the range of 200 for an example 8 MHz processor and 19200 bit rate. In accordance with this method, the actual bit-time or bit-duration will vary with the actual clock period and the bit-time may exhibit variations over time due to variations over time of the clock period and due to effects in the electronics used in the generation, such as jitter caused by for example noise on the clock signal or signal or edge steepness deterioration due to impedance networks as posed by communication channels or channel segments.

Upon transmission of the bit stream, the second control unit will receive the bit stream of the serial communication, e.g. via its bidirectional communication port.

In an embodiment of the first frequency synchronisation method, the second control unit is configured to measure, in a second step of the method, the duration or period of 8 data bits by measuring the time from the first rising edge of a sent byte 0x55 to the fifth rising edge of the start bit following byte 0x55. The resulting duration may then be used, in a third step of the method, to set a counter or timer such that the instances at which the incoming data bits are sampled are in the middle of the data bits received after a synchronization to the signal, e.g. using mechanisms such as pre-ambles, start- and stop bits and the like and using a first half bit duration offset. This synchronisation mechanism as applied resembles a method typically referred to as autobaud. However, in known, practical implementations of autobaud which are available on the market, the result of the autobaud measurement of the bit-time or bit-duration is not stored with a sufficient resolution to support a sufficiently accurate synchronisation.

In order to obtain a sufficiently high accuracy, in an embodiment of the first frequency synchronisation method, referred to as the 3-measurement-method, the second control unit measures the length of a data element as transferred over the serial communication line. A possible implementation is to start the transmission with a start bit, then send the N bits or of the data element and to end with 1 or 2 stop bits. Typically the transferred data element is a byte (N=8). Note however, that the data element may also consist of a number of symbols (each consisting of one or more bits), whereby the transmission starts with a start symbol and ends with an end symbol. By measuring the time between the rising edge of the start bit of the first byte and the start bit of the second byte, the bit-time or bit-duration can be calculated using the total number of start, data and stop bits, and the counter or timer can be loaded with the correct sample value as explained above. A condition is that the transmission of the second byte immediately follows that of the first byte.

Figure 9:
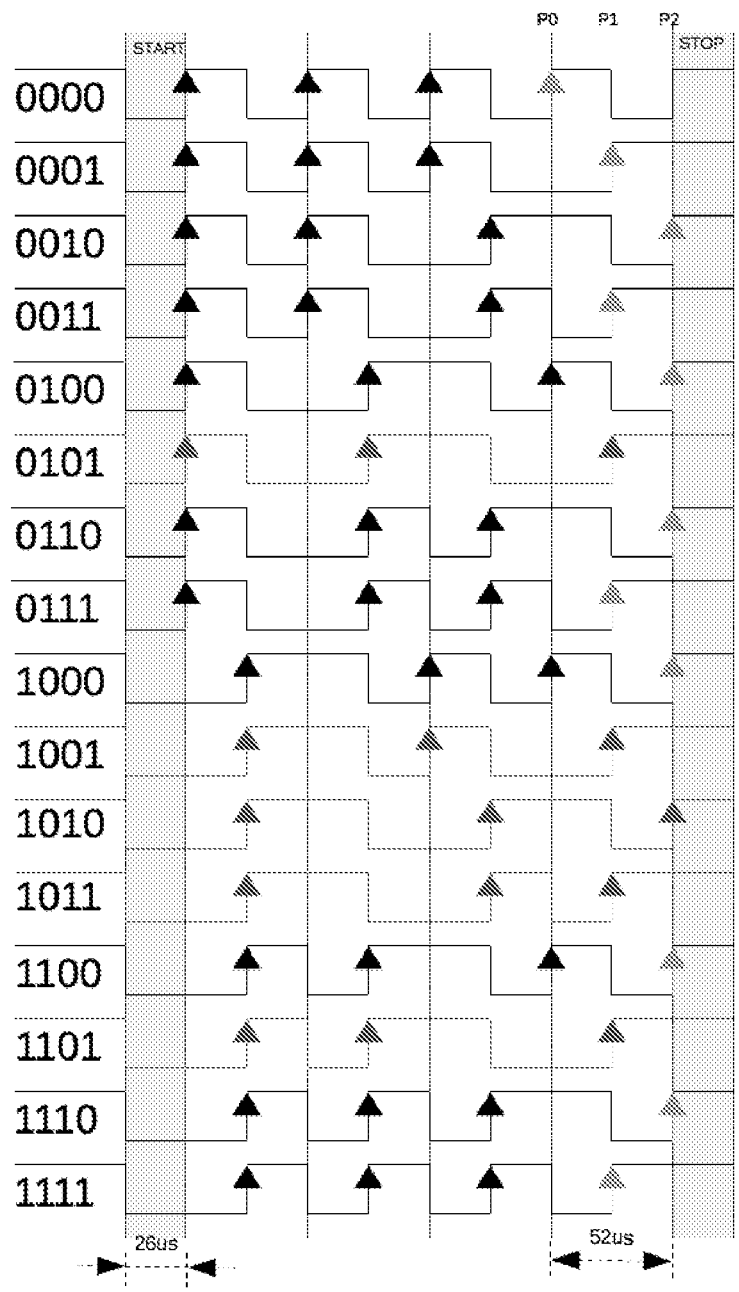
FIG. 9 depicts a Manchester coding of 4 bit symbols.

In an embodiment the serial communication may use Manchester encoding. In this embodiment, the second control unit measures the length of four rising edges in each regular data byte. Using Manchester encoding, each data element will either have 3 or four rising edges. The data elements having 4 rising edges may have their fourth rising edge at 3 distinct instances P0, P1 and P2 within the data element duration as is illustrated in FIG. 9.

As the clocks of the first and second control unit are synchronised, the measurements will form a distribution around the P0, P1 and P2 instances with a neglible overlap. This allows the resulting measurement to be classified as a P0, P1 or P2-measurement and by also taking the position of the first rising edge into account (derivable from the received data element value) the measurement can be converted to a value of a bit-duration or a data element-duration. As can be seen in FIG. 9, data elements having 3 rising edges will not have a fourth rising edge measurement within the P0, P1 and P2 distributions and may be classified as invalid for time measurement after the P2 distribution's largest time has passed. No timing result will be produced for such a data element.

As data elements with 4 rising edges will occur regularly in a data stream, measurement results are obtained quite often resulting in a plurality of instants to control and/or adjust the clock mechanism to become faster or slower, in order to keep in synchronisation with the first control unit. Note that it may not be required to actually adjust the clock mechanism of the second control unit; based on the determined bit-time or bit-duration. Based on the measured bit-time, one may determine a ratio of the clock periods of both control units and use this ratio to scale the timing of actions of the second control unit.

Note that, as will be understood, that the based on the measurement results, one may equally adjust the modulation control signal of the first control unit to the clock signal of the second control unit.

In accordance with an embodiment of the frequency modulation method, the measurement results as discussed above may be used to adjust the frequency of the signal delivered by the clock mechanism:

In an embodiment the clock mechanism delivers the instruction clock signal of the processor. Slowing down that clock signal or speeding up that clock signal slows down respectively speeds up all operations of the processor and thus also the modulation clock signal.

Slowing down or speeding up the instruction clock signal depends on the processor and the clock generation circuitry chosen in the design of the control units. In case of a simple external crystal or ceramic resonator, some tuning can be done by changing the parallel capacitor(s) that is(are) typically connected to the crystal/resonator. Dedicated electronics possibly controlled by software can be used to deliver a tuneable clock. Another method is using a processor internal tuning method.

In an embodiment, the clock mechanism delivers a repetitive interrupt signal which determines the timing of the modulation.

Typically a repetitive interrupt is generated by configuring the processor used to implement the control units to have a timer (works like a counter) that counts down (the dual case: counting up can be equally well used) from a pre-loaded value and triggers an interrupt when it rolls over from the 0 value to the pre-loaded value. The configuration during the initialization of the processor than comprises the steps of configuring the counter to re-load from a register at the next active clock edge when at counter value 0, enabling the counter to interrupt the processor, setting the start value for the counter in the register and also pre-loading this value in the counter, and to start the counter.

To slow down the interrupt rate during normal operation, the value in the register can be set to a higher level, to speed up the interrupt rate, the value in the register can be set to a lower level, thus slowing down or speeding up the modulation clock signal.

In an embodiment, the measured bit-time or bit-duration is multiplied with a factor and directly loaded in the interrupt timer, via the register.

Method 2:

In an embodiment of the frequency synchronisation method as applied in the present invention, the start of the modulation time window or of a period or sub-window is made detectable by having the LED driver generate a distinct current pulse in the current waveform, the distinct current pulse coinciding in time with the start of the modulation time window, period or sub-window.

The detection by the interface board (or LED engine) of the distinct current pulse can either be done directly from a current measurement or from the forward voltage resulting from the current flowing through an LED-group.

In an embodiment of the present invention, the modulation clock signal or the interrupt signal may be used to synchronise switching operations, e.g. of the LED driver or may be used to initiate the generation of a distinct current pulse.

As an example, assume a modulation time window MTW of 3.3. msec, that is subdivided in to 8 sub-windows of 416 μsec.

Note that, within the meaning of the present invention, the sub-windows may also be referred to as slots or time slots since, in an embodiment, each sub-window or time slot may have a dedicated purpose, i.e. it may be used to apply a desired current modulation to a particular LED or LED group of the light engine.

Further, in the example given, a modulation clock signal or interrupt signal may be generated every 26 μsec, enabling to initiate control actions every 26 μsec when desired. Note that alternative selections of the duration of the modulation time window, the sub-windows or the clock signal timing may be considered as well.

In such example, a distinct current pulse, either an increase in current or a drop in current may be generated at the start of each modulation time window MTW, e.g. every 3.3 msec. Such a current pulse may e.g. be detected by means of a current measurement, performed by the light engine or by a voltage detection across the LED or LED group that is being powered; more specifically, the application of a current pulse to an LED or LED group will result in an associated pulse of the forward voltage Vf across the LED or LED group.

With respect to the application of such current pulses, such a current pulse may have, in the numeric example as given above, a duration of 26 μsec.

With respect to the application of current pulses to indicate the start of a modulation time window, it may be pointed out that additional synchronisation instants may be obtained, e.g. in case the LED driver does not operate in a continuous current mode, whereby the LED driver provided in a substantially constant current during the entire modulation time window MTW, as e.g. shown in FIG. 5, but whereby the LED driver operates in a duty cycle mode, as e.g. shown in FIG. 6. In case the LED driver operates in duty cycle mode, the start of each sub-window may be apparent from the rising edge of the supply current, i.e. at instants t=0, t=t1, t=t2 in FIG. 6.

Within the meaning of the present invention, a current pulse may e.g. be characterised by a sudden increase or decrease of the current as supplied by the LED driver. Such a sudden increase or decrease may be detected by a light engine, e.g. by means of a current measurement or a voltage measurement across a component supplied with the current. The detected increase or decrease of current may be used as a trigger indicating the start (or end) of a modulation time period or a sub-window.

Phase Synchronisation

Within the meaning of the present invention 'phase synchronisation' is the term used to synchronize the second control unit to the first control unit in such manner that they both work together to achieve the same overall purpose in each separate modulation cycle, period or sub-period etc.

This can be illustrated by the following scheme,

Whereby:

FCU=first control unit,

SCU=second control unit,

LG1=LED group 1, LG2=LED group 2, and so on.

Assuming we have a modulation time window that is subdivided into 4 sub-windows or time slots, whereby, during each time slot, the required current needs to be generated. The following operating scheme or sequence can be considered an erroneous synchronisation or out-of-phase synchronisation:

FCU: |LG1|LG2|LG3|LG4|LG1| etc

SCU: |LG2|LG3|LG4|LG1|LG2| etc

As can be seen from the scheme, in a first time slot, the FCU performs control actions for the LG1, while the SCU performs control actions for the LG2.

In case the FCU controls the LED driver and the SCU controls the switching assembly of the light engine, this situation would correspond to the FCU enabling the LED driver to generate, in the first time slot, the desired current for LED group 1 (LG1), while the SCU controls the switching assembly such that the supply current (intended for LG1) is provided to LG2. As will be understood, this would not result in an illumination corresponding to a desired illumination as indicated by a received set point.

The appropriate operating scheme or sequence would have to be:

FCU: |LG1|LG2|LG3|LG4|LG1| etc

SCU: |LG1|LG2|LG3|LG4|LG1| etc

In order to ensure that the control units are phase synchronised, in an embodiment, a message may be sent via the serial communication line from the first control unit to the second control unit to identify the purpose or period the first control unit is working on, for example LG2. The second control unit then adapts its actions to also work on overall purpose P2. After a larger time (e.g. 100 milliseconds dependent on implementation details, mainly depending on how long the controllers stay in sync) this sync message may be repeated.

It may further be noted that, when both control units are in frequency synchronisation, they can work for a comparatively long time in phase synchronisation without actively re-syncing them. For the time-frames given above, whereby the modulation time window is e.g. 3.3 or 6.6. msec, it may be sufficient to re-synchronise (i.e. re-sync) every 100 msec.

In an embodiment of the present invention, the modulation time window is subdivided into a plurality of sub-windows, e.g. having a fixed length, whereby control of the switching assembly and control of the LED driver is performed as if such a sub-window is a modulation time window. As such, rather than applying a particular current modulation scheme and duty cycle modulation scheme in the modulation time window comprising the sub-windows, a current modulation scheme and duty cycle modulation scheme are applied within each sub-window. By doing so, the current modulations may occur at a higher frequency, resulting in a flicker reduction. In such arrangement, the same current modulation scheme and duty cycle modulation scheme may be applied in each sub-window. However, this is not a requirement. Different modulation schemes may be applied in the different sub-windows of the modulation time window. As a boundary condition, the modulation schemes as applied in the different sub-windows should be such that, when observed over the modulation time window, the desired illumination characteristic has to be realised. This provides in an increased flexibility on how to modulate the currents and control the switch assembly during each sub-window.

Figure 10:
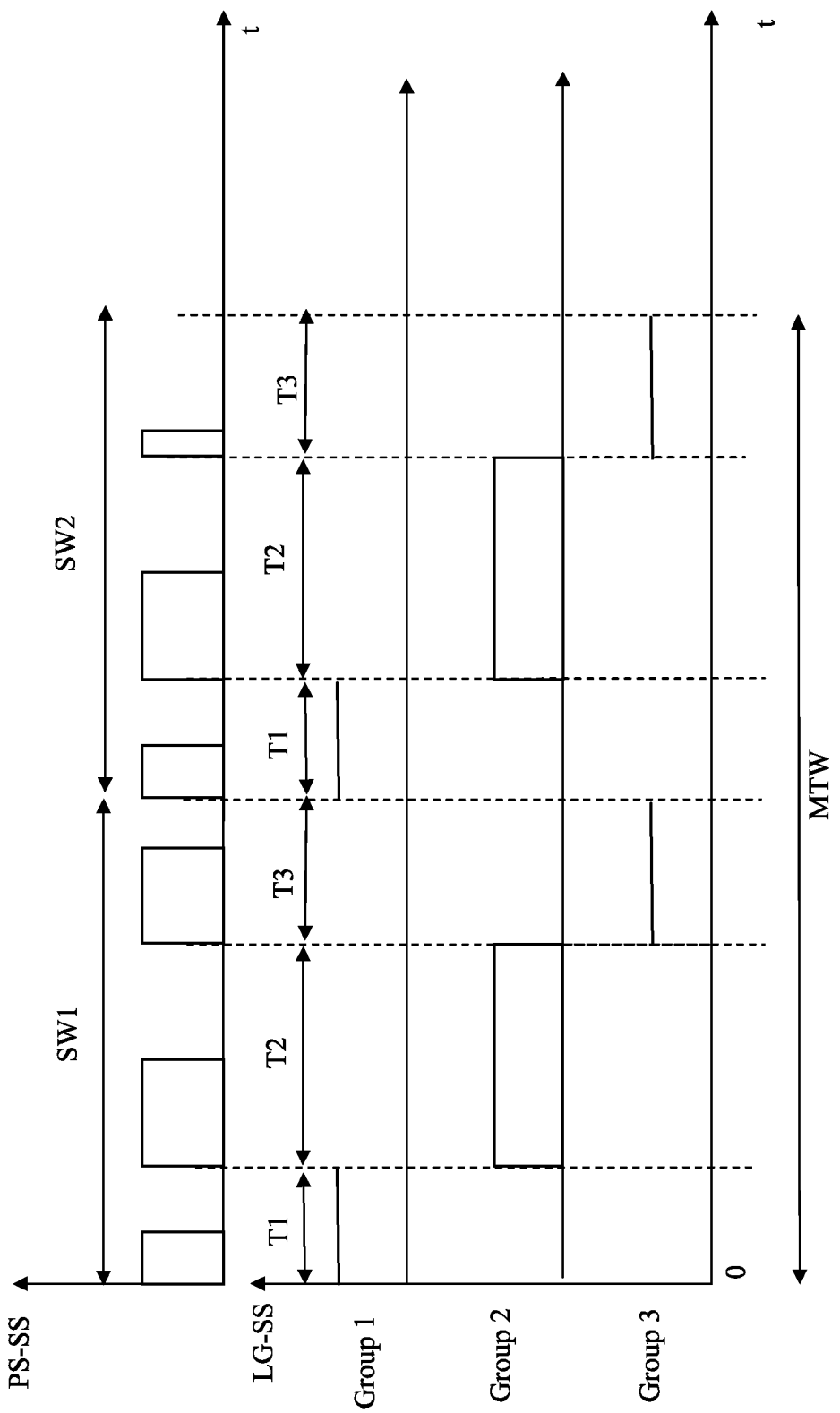
FIG. 10 depicts a duty-cycle modulation scheme and corresponding time-division scheme as can be applied in an embodiment of the present invention.

An example of such a subdivision of a modulation time window is schematically shown in FIG. 10, whereby a modulation time window MTW is considered subdivided into two sub-windows SW1, SW2, each having their own switching scheme PS-SS and LE-SS. As can be seen, different switching schemes PS-SS are applied in SW1 and in SW2; the ON-time of group 3 is longer during the first sub-window SW1, compared to the ON-time during the second sub-window SW2. Overall, when considered over the entire modulation time window, the same illumination characteristic as with the schemes of FIG. 6 may be e.g. obtained.

It can be pointed out that, in such an arrangement whereby current modulation schemes and switching schemes are applied within a sub-window of a modulation time window, a synchronisation, as e.g. discussed above, needs to be performed per sub-window. In particular, within each sub-window, a phase synchronisation, as discussed above, needs to be performed to ensure that the appropriate current arrives at the appropriate LED or LED group.

Further, in such case, it may be advantageous to perform an additional synchronisation, i.e. a synchronisation indicating the start (or end) of each sub-window. Such a synchronisation may e.g. be referred to as sub-window synchronisation.

In an embodiment of the present invention, the synchronisation between an LED driver and a light engine or switch assembly or, as discussed below, an interface module, may be performed via a communication channel, e.g. a serial communication channel, as discussed above.

Alternatively, a synchronisation may be performed by means of pulses, e.g. current pulses that are generated by the LED driver and detected by the light engine, switch assembly or interface module. Such pulses may e.g. be applied for the above described frequency synchronisation, phase synchronisation or sub-window synchronisation.

In an embodiment, the LED driver is configured to apply different types of pulses for different types of synchronisation. As an example, the LED driver may be configured to apply a first type of pulse to indicate the start (or end) of a modulation time window and a second type of pulse to indicate the start (or end) of s sub-window.

In an embodiment of the present invention, different types of current pulses are applied to realize the different synchronisations, i.e. the above indicated frequency synchronisation, the phase synchronisation and the sub-window synchronisation.

As a first example of a current pulse that can be applied, a reduction of the current to zero during a predetermined period, e.g. 10 µsec or 20 µsec or 26 µsec, can be applied as a synchronisation signal. Such a pulse is schematically shown on the left in FIG. 11. As schematically shown, the current I, e.g. a current supplied by the LED driver of the modular system according to the present invention, drops from a nominal value In to zero for a period Tp, e.g. 26 µsec.

Figure 11:
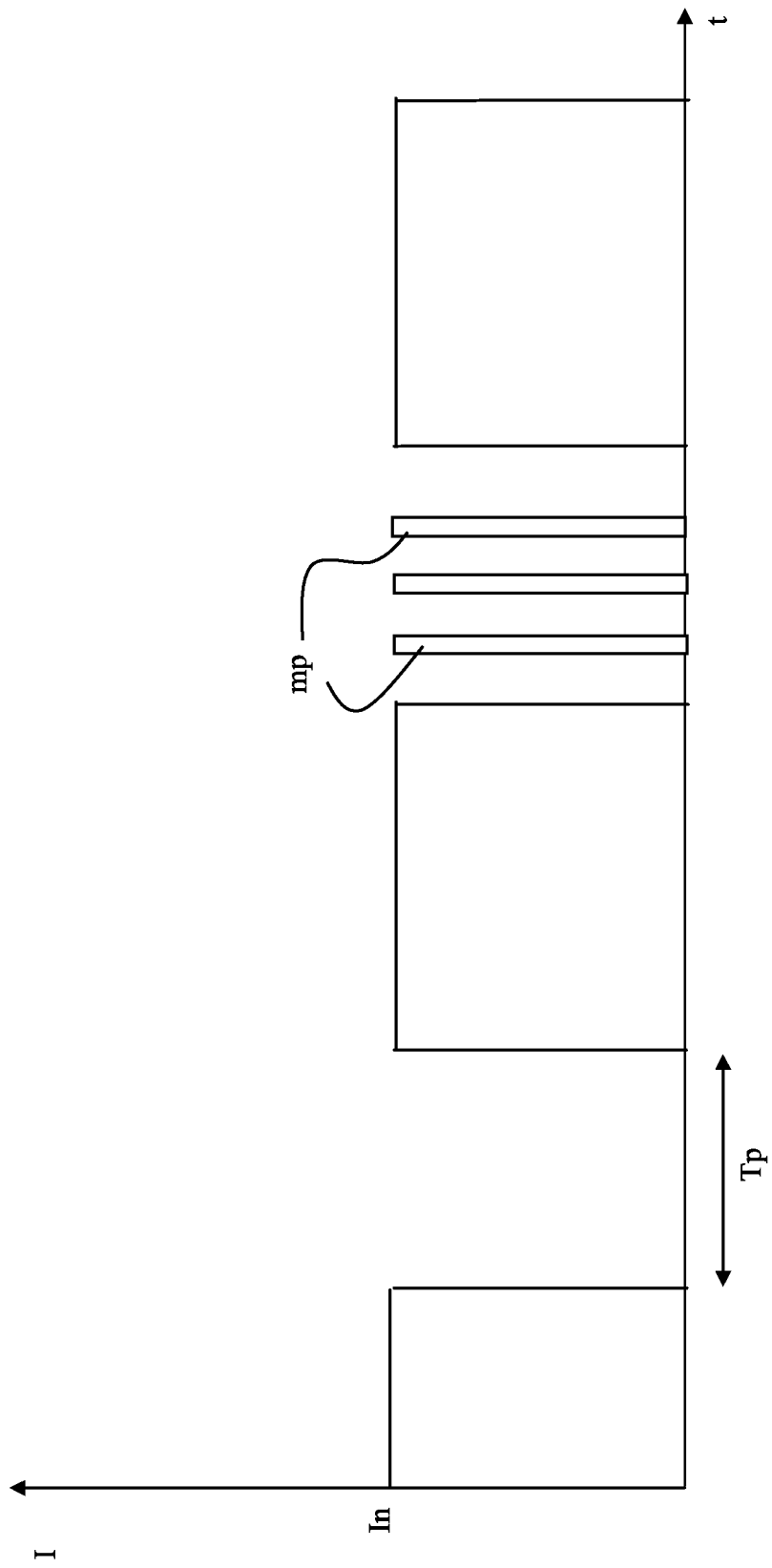
FIG. 11 depicts two possible current pulses as can be applied for synchronisation in an embodiment of the present invention FIG. 12 schematically shows an LED driver as can be applied in a modular system according to the present invention.

A second example of a current pulse as can be generated by an LED driver in a modular system according to the present invention is schematically shown on the right in FIG. 11. In the embodiment as shown, the LED driver generates, within the period Tp, three very short pulses mp, also referred to as micropulses. Said pulses may e.g. have a duration that is a fraction of the period Tp, e.g. 1 or 2 µsec.

The occurrence of such micropulses may e.g. be detected by observing the forward voltage Vf over an LED or LED group to which the current with the current pulse is supplied. The application of a current pulse, either with or without one or more micropulses, will result in a change in the forward voltage over the LED or LED group. In order to assess the occurrence of the current pulse, in particular the occurrence of micropulses in the current pulse, a high pass filter may be applied to a signal representative of the forward voltage. By using such a filter, the occurrence of the micropulses and their position within the period Tp can be determined.

In an embodiment, the application of one or more micropulses can be used for a particular type of synchronisation. In case a modulation time window as applied in a modular system according to the present invention is subdivided in sub-windows, the application of micropulses may be used to identify the different sub-windows, more specifically to indicate the start of each sub-window.

In an embodiment, micropulses such as micropulses mp as shown in FIG. 11 are used to communicate between the LED driver and the light engine or interface module. In such embodiment, the presence or absence of a micropulse at a certain instant in time can be considered a logical "1" or "0". Assuming e.g. that within the period Tp, 8 distinguishable micropulses can be generated, then one could consider such a sequence to represent an 8 bit symbol. Such an 8 bit symbol may contain more information that merely the identification of the sub-window within a modulation time window. Other information that may be relevant to the light engine or interface module may be included in such an 8 bit symbol as well.

As an example, the sequence of micropulses, e.g. representing an 8 bit symbol, may, in addition to the identification of a sub-window, also indicate the operating mode of the LED driver, or more specifically, the operating mode of the LED driver that is applied to the identified sub-window. As illustrated above, in order to generate a particular dimming level, different operating modes may be applied. As will be clear from the switching schemes illustrated above, the operating mode of the LED driver affects the switching scheme, e.g. the light engine switching scheme LG-SS, that needs to be applied. As such, the information contained in the one or more micropulses may be indicative for the operating mode of the LED driver.

It may further be pointed out that the application of the micropulses for the purpose of synchronisation or for transmitting information need not be applied within a current pulse as illustrated on the left of FIG. 11. The micropulses may also be applied during a period where the current is intended to be zero, e.g. at instants t=0, t=t1 and t=t2 in FIG. 2. As yet another alternative, the micropulses may also be superimposed on the continuous current, e.g. current In as shown in FIG. 5, at the required instants, to indicate the start of a modulation time window, or a sub window.

With respect to the subdivision of modulation time window MTW as e.g. illustrated in FIGS. 5-10 into sub-windows or periods during which certain LEDs or LED groups are activated, it may be pointed out there may be advantages in activating the different LEDs or LED groups in a certain order. In addition, it may be preferred to split up the activation of certain LEDs or LED groups over different periods.

In an embodiment of the present invention, the activation of the different LEDs or LED groups, such as Group 1, Group 2 and Group 3 in FIGS. 5-10, is ordered in such manner that the dominant LED or LED groups is activated first in the modulation time window. Within the meaning of the present invention, the dominant LED or LED group refers to the LED or LED group that needs the provide the largest portion of illumination. In case of operating in a continuous current mode, the dominant LED or LED groups would be the one having the largest ON-time. In FIGS. 5-10, this would be Group 2.

In an embodiment of the present invention, the groups are activated in descending order, starting with the dominant LED or LED group.

In an embodiment of the present invention, the ON-time of the dominant LED or LED group, e.g. period T2 in FIG. 5, is subdivided into two periods, whereby these periods are applied at the beginning and at the end of the modulation time window. As such, with reference to FIG. 5, the switching scheme LG-SS of the groups may have the following sequence:

a first period T2/2 during which Group 2 is activated;
a second period T1 during which Group 1 is activated;
a third period T3 during which Group 3 is activated;
a fourth period T2/2 during which Group 2 is activated.

It has been observed that by subdividing the ON-time of the dominant LED or LED group into at least two periods, one of which is arranged at the beginning of the modulation time window and one of which is arranged at the end of the modulation time window, the effect of jitter can be mitigated.

In an embodiment, the present invention provides in a light engine comprising an LED assembly configured to receive a supply current from an LED driver, the LED assembly comprising a plurality of LEDs and one or more switches arranged in series or in parallel with one or more LEDs of the plurality of LEDs. The light engine further comprises a control unit configured to control the one or more switches of the LED assembly, thereby controlling an LED current through the plurality of LEDs; the control unit is further configured to:

receive, at an input terminal, a set point representing a desired illumination characteristic of an LED assembly of the light engine determine, based on the received set point, a current amplitude modulation scheme and a duty cycle modulation scheme;

output a first output signal representative of the current amplitude modulation scheme for processing by an LED driver control unit of the LED driver;

wherein the current amplitude modulation scheme represents an amplitude of the supply current to be provided by the LED driver as a function of time within a modulation time window and the duty cycle modulation scheme represents switching operations for the one or more switches as a function of time within the modulation time window and wherein the current amplitude modulation scheme and the duty cycle modulation scheme are configured to, when applied by the LED driver control unit and the control unit, to generate the desired illumination characteristic.

In accordance with an embodiment of the present invention, the current amplitude modulation scheme may e.g. be in the form of an array of set points (i.e. current set points) to be delivered by an SMPC of an LED driver to which the light engine is connected. As such, in an embodiment, the control unit of the light engine assumes the role of master control unit, controlling the switches of the LED assembly and in addition, outputs a control signal for controlling the LED driver, in particular an SMPC of the LED driver to which the light engine is connected or connectable.

The LED driver as applied in the present invention may have multiple outputs or output channels, each being capable of outputting a supply current with a particular desired amplitude. Such multiple outputs may during use e.g. be connected to a respective multiple channels or input terminals of a light engine, in order to supply multiple groups of LEDs of an LED assembly of a lighting engine.

Figure 12:
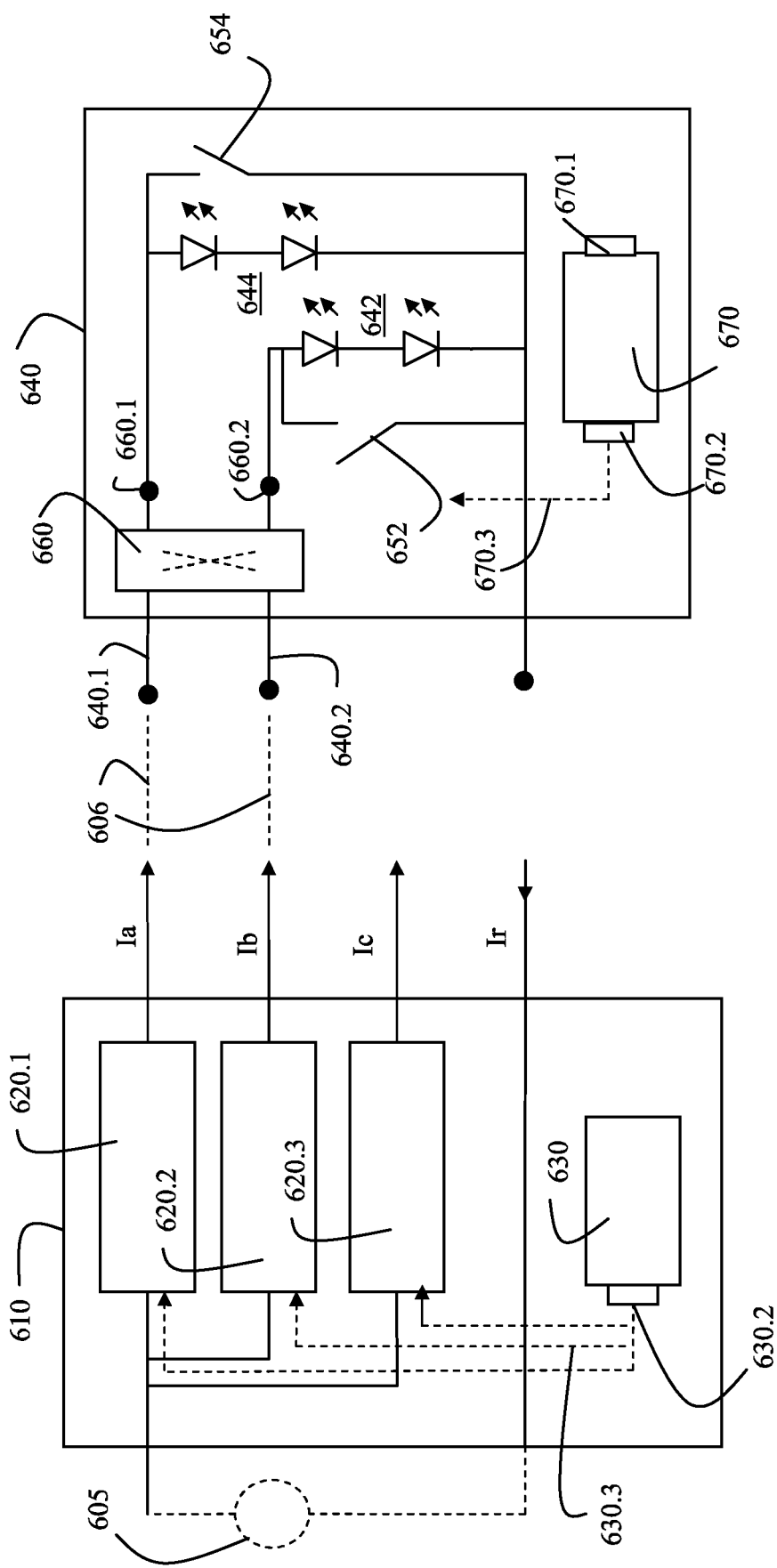

FIG. 12 schematically shows such an LED driver. FIG. 12 schematically shows an LED driver 610 as can be applied in a modular system according to the present invention. The LED driver 610 as shown comprises three power converters, e.g. switched mode power converters 620.1, 620.2 and 620.3, each configured to output a current Ia, Ib, Ic upon operation. In FIG. 12, line Ir denotes a common return path for the currents Ia, Ib and Ic. Alternatively, each of the power converters 620.1, 620.2 and 620.3 may have its own return path of the supplied current. In the embodiment as shown, the LED driver 610 further comprises a control unit 630 configured to control the three power converters. The control unit 630 as shown may e.g. be configured to control the power converters in a similar manner as the control unit 230 controls the power converter 220 of FIG. 2; i.e. by controlling a switch of the power converters 620.1, 620.2, 620.3, the output current of the converters can be adjusted. In the embodiment as shown, the control unit 630 is configured to provide, via an output terminal 630.2 of the control unit, a control signal 630.3 to the power converters, to control the respective output currents Ia, Ib, Ic. In the embodiment as shown, the three power converters are supplied by a common power supply 605, e.g. a DC voltage supply or a rectified AC power supply or an AC supply. In the latter case, each of the power converters may e.g. be equipped with a rectifier circuit to provide each of the power converters with a suitable DC supply voltage. FIG. 12 further shows a light engine 640 as can be applied in a modular system according to the present invention. Compared to the light engine 210 as shown in FIG. 1, the light engine 640 has two input terminals 640.1 and 640.2 to which a power source can be connected. In the embodiment as shown, by the dotted lines 606, current Ia is provided to terminal 640.1 and current Ib is provided to terminal 640.2. In the embodiment as shown, the light engine comprises two LED groups 642 and 644, each comprising two LEDs.

The current through the LED groups 642 and 644 may be controlled by controlling the state of the respective switches 652 and 654 that are arranged in parallel to the LED groups. The light engine as shown further comprises a switch assembly 660 that is configured to receive the currents Ia and Ib and control to which of the outputs 660.1, 660.2 of the switch assembly 660 which of the currents is directed. Using such a switch assembly 660, the LED groups may thus be supplied by current Ia or current Ib.

Such an embodiment provides the possibility to adjust an illumination characteristic of the light engine, without having to adjust an operation of the LED driver. As an example, the output currents Ia, Ib may e.g. be 1 A and 0.1 A; LED group 642 may comprise a pair of warm white LEDs, whereas LED group 644 may comprise a pair of cold white LEDs, warm and cold referring to the colour temperature of the white LEDs. In this example, the illumination characteristic of the light engine as a whole can be changed in a range from comparatively warm white to cold white by modulating the current provisions. In addition to changing the colour temperature of the white light as outputted by the light engine, the intensity of the light output may also be adjusted by operation of the parallel switches 652 and 654. Such a way of modifying the intensity does not provide a control of the LED driver currents Ia and Ib either. In order to control the switches 652 and 654 and the switch assembly 660, the light engine 640 comprises a control unit 670 which may e.g. be configured to receive, at an input terminal 670.1, an input signal representing a desired illumination characteristic of the light engine and output, at an output terminal 670.2, output signals 670.3 to control the switches 652, 654 and switch assembly 660, in order to realise the desired illumination characteristic.

By controlling the light engine in this manner, the LED driver may be kept comparatively simple and inexpensive. In particular, the output currents as provided by the power converter of the LED driver need not be controlled or adjusted to obtain a desired illumination characteristic.

Figure 13:
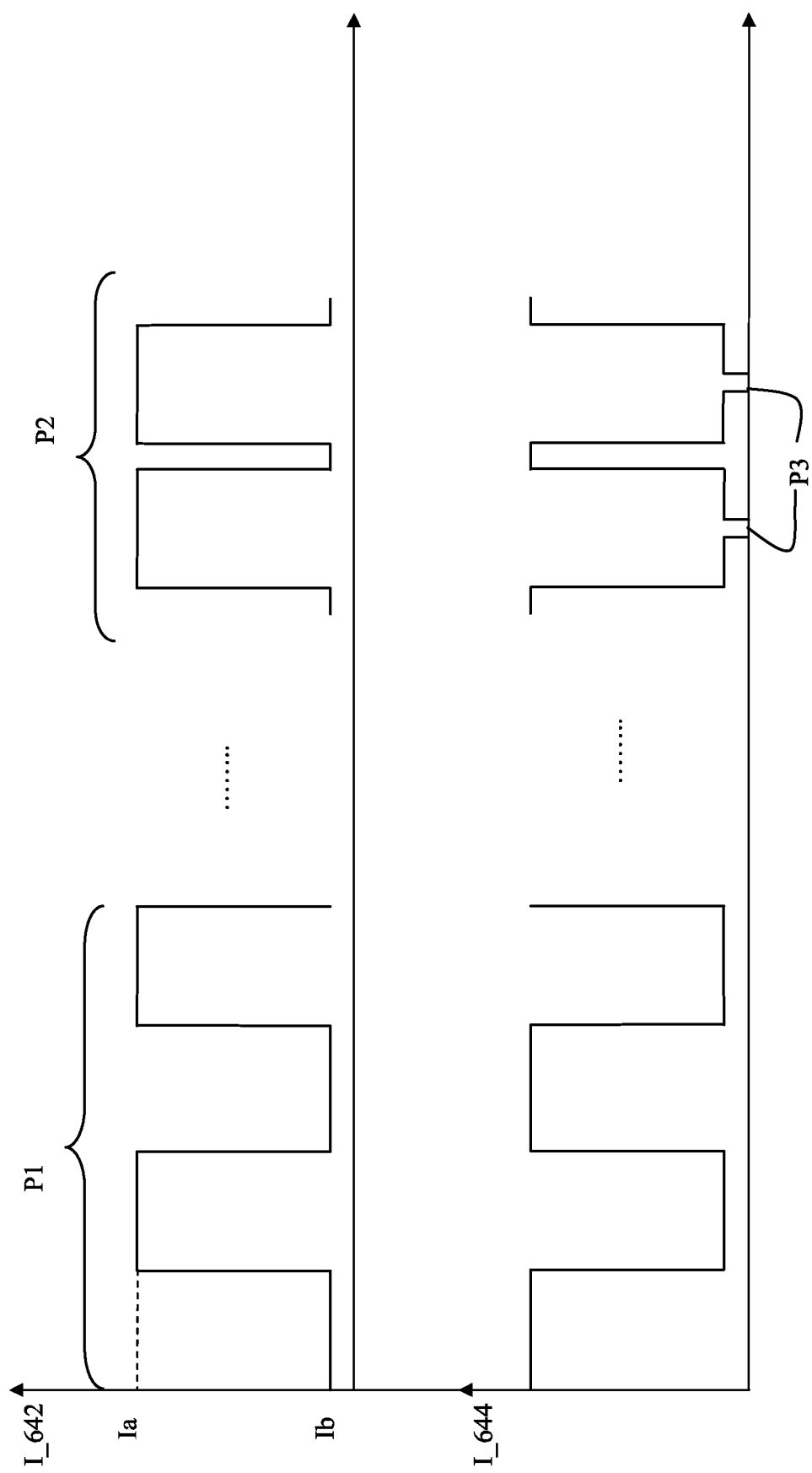
FIG. 13 schematically depicts possible current profiles for LED groups of a light engine as applied in a modular system according to the present invention.

In FIG. 13, a possible current profile through the LED groups 642 and 644 is schematically shown assuming the availability of a current Ia and Ib. the top graph shows the current I_642 through the LED group 642 (e.g. warm white LEDs), whereas the bottom graph shows the current I_644 through the LED group 644 (e.g. cold white LEDs). During period P1, each group received current Ia for 50% of the time and current Ib for 50% of the time. Period P1 may e.g. correspond to the modulation time window as discussed above. During period P2, LED group 642 receives current Ia during approx. 80% of the time and current Ib during 20% of the time; whereas LED group 644 receives current Ia during approx. 20% of the time and current Ib during approx. 70% of the time, i.e. less than 80%. This may e.g. be realised by closing switch 654 during 10% of the time, e.g. during period P3 as indicated.

In the embodiment as shown, there is no need to actually control the currents as provided by the LED driver, and thus, there is not need for communication between the control unit 670 of the light engine and the control unit 630 of the LED driver. However, it may be advantageous to, as e.g. described above, to synchronise the switching operations of the switches of the light engine with the switching operations occurring in the power converter. In order to realise this, the above described synchronisation methods may be applied.

Figure 14:
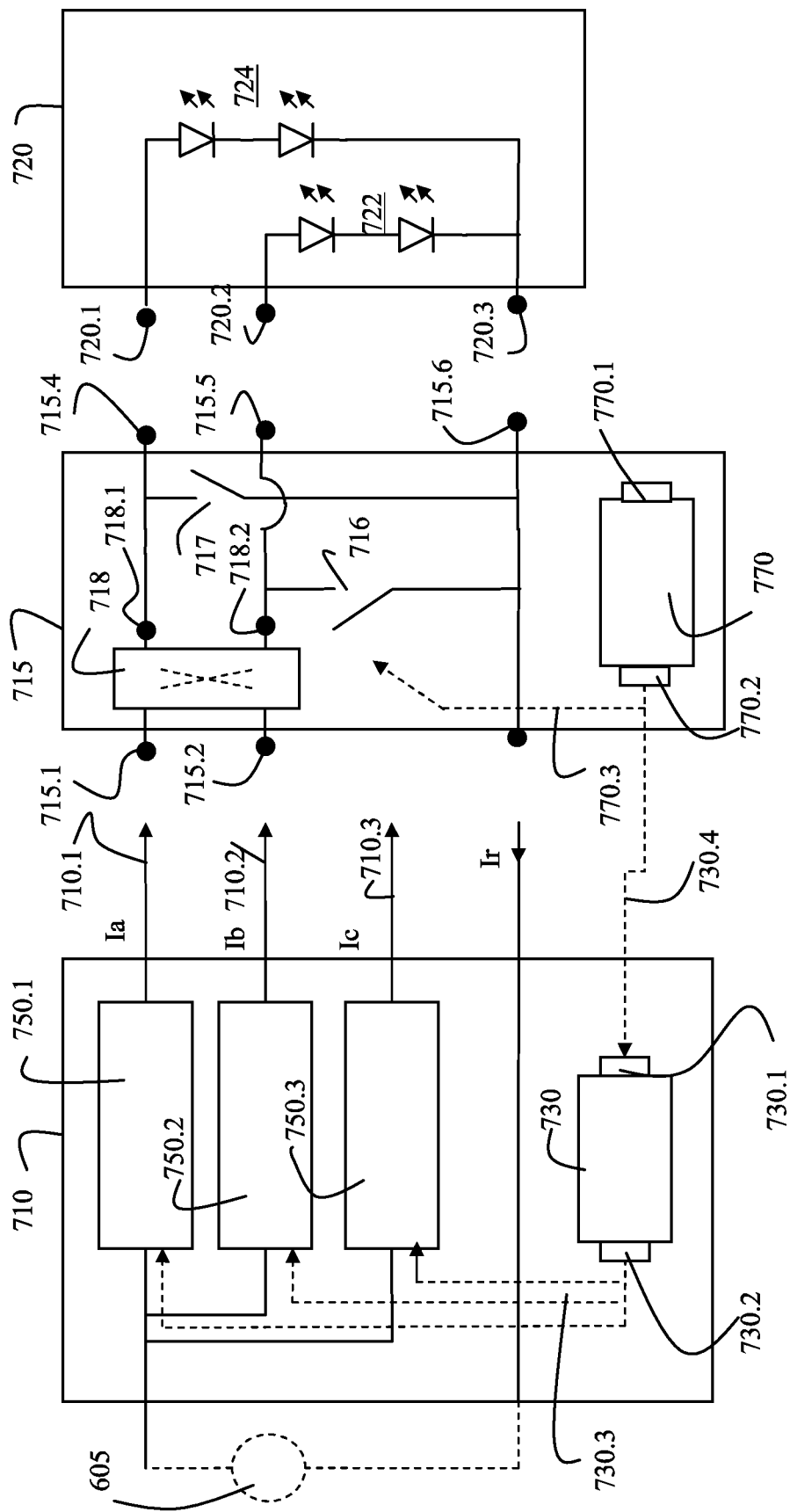
FIG. 14 depicts a combination of an LED driver, an interface module and a light engine according to an embodiment of the present invention.

In an embodiment, the present invention provides in a modular system comprising an LED driver 710, a light engine 720 and an interface module 715. Such an embodiment is schematically shown in FIG. 14.

In accordance with the present invention, the interface module 715 is configured to be connected to both the LED driver 710 and the light engine 720. In the embodiment as shown, the LED driver 710 may be the same as the LED driver 610 as shown in FIG. 13, the LED driver being configured to output three currents Ia, Ib, Ic, at respective output terminals 710.1, 710.2 and 710.3, the output currents being provided by three power converters 750.1, 750.2 and 750.3 of the LED driver. The LED driver 710 further comprises a control unit 730 which may be similar to the control unit 630 of FIG. 12, i.e. the control unit 730 may be configured to provide, at an output terminal 730.2, a control signal 730.3 to control the power converter of the LED driver. In the embodiment as shown, the output terminals 710.1, 710.2 of the LED driver 710 may be connected to input terminals 715.1 and 715.2 of the interface module 715, while the output terminals 715.4, 715.5 and 715.6 of the interface module 715 may be connected to input terminals 720.1, 720.2 and 720.3 of the light engine 720. As such, in the embodiment as shown, currents Ia and Ib of the LED driver may be provided, via the interface module 715 to LED groups 722 and 724 of the light engine. In the embodiment as shown, the interface module is provided with switches 716 and 717 and a switch assembly 718, the latter being configured to receive the currents Ia and Ib and control to which of the outputs 718.1, 718.2 of the switch assembly 718 which of the currents Ia, Ib is directed. As can be seen by comparing FIGS. 12 and 14, the topology of the light engine 640 of FIG. 12 enables the same functionality as the combination of the interface module 715 and light engine 720. In the embodiment as shown, the interface module 715 further comprises a control unit 770, which may e.g. have the same functionality as the control unit 670 of FIG. 12, i.e. the control unit 770 may be configured to receive, at an input terminal 770.1, an input signal representing a desired illumination characteristic of the light engine and output, at an output terminal 770.2, output signals 770.3 to control the switches 716, 717 and switch assembly 718, in order to realise the desired illumination characteristic.

In accordance with the present invention, it is also worth mentioning the that the use of an interface module, such as the interface module 715 may also advantageously be applied in combination with an LED driver that only outputs a single current, e.g. an LED driver 200, 305 or 510 as shown in FIGS. 1, 3, 4.

Figure 15:
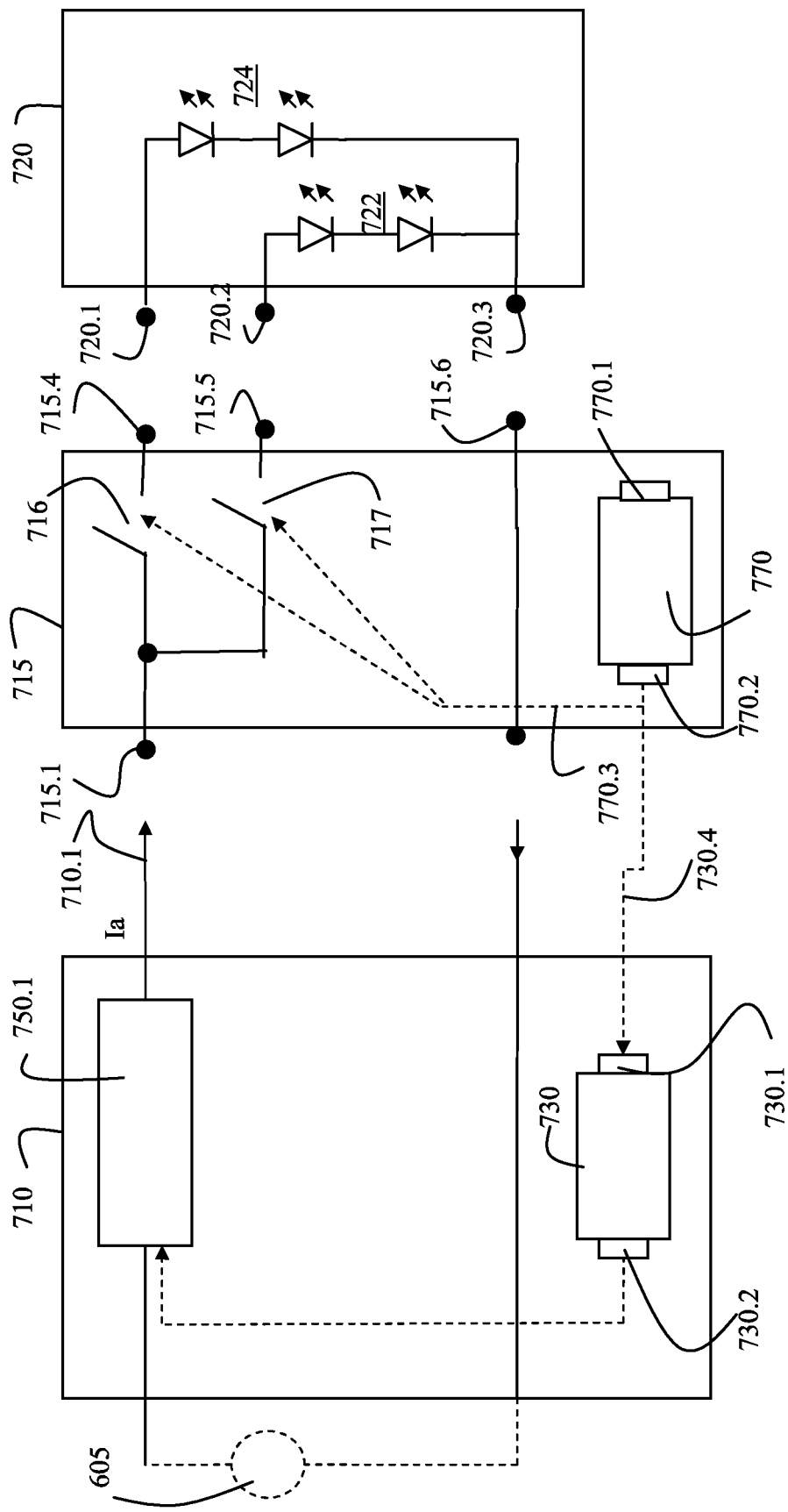
FIG. 15 depicts a combination of an LED driver, an interface module and a light engine according to another embodiment of the present invention.

An embodiment of such a modular system is schematically shown in FIG. 15. FIG. 15 schematically shown a modular system comprising an LED driver 710, said LED driver being a simplified version of the LED driver 710 of FIG. 10, the LED driver only having one output current Ia, a light engine 720 similar to the light engine 720 of FIG. 14 and an interface module 715 configured to receive the current Ia of the LED driver and provide the current, depending on the operating state of the switches 716, 717, to either one of the LED groups 722 or 724 of the light engine. In a similar manner as described with reference to FIG. 14, the switches and the LED driver can be controlled using the control unit 730 of the LED driver and the control unit 770 of the interface module 715.

As such, in an embodiment of the present invention, a modular system may comprise an LED driver, e.g. LED driver 710, configured to output a supply current, a light engine comprising a plurality of LEDs or LED groups, that are accessible via input terminals, e.g. terminals 720.1, 720.2 and 720.3, of the light engine and an interface module configured to control to which LED or LED group the current of the LED driver is supplied.

Figure 16:
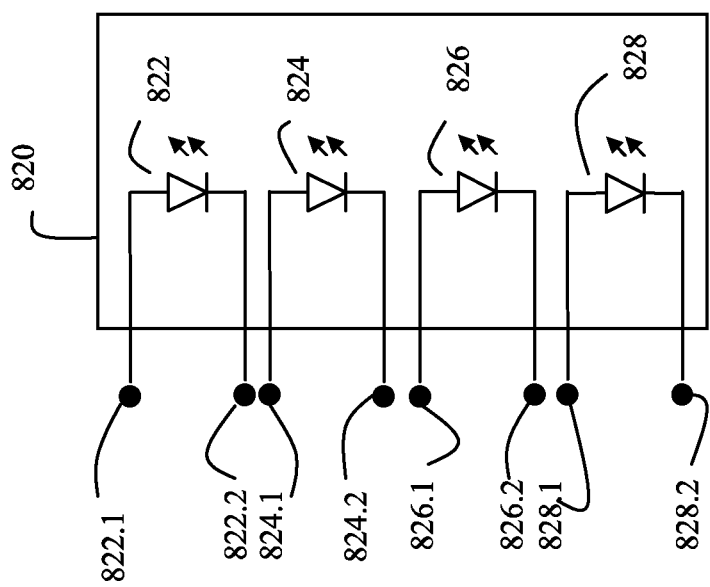
FIG. 16 depict a light engine as can be applied in an embodiment of the present invention.

By using an interface module as e.g. shown in FIG. 14 or 15 in a modular system according to the present invention, an increased functionality and flexibility may be obtained when using comparatively simple LED drivers and light engine. In particular, by applying a light engine of which the terminals of the LEDs or LED groups are made accessible, any desired topology for driving the light engine may be realised in the interface module, rather than fixating a particular topology. Note that in the light engine as shown in FIG. 14 or 15, there is already some grouping applied in the LED groups 722 and 724. To further increase the functionality, a light engine with 4 LEDs may be provided in a fixture as schematically shown in FIG. 16. In the light engine 820 of FIG. 16, all terminals for connecting the 4 LEDs 822, 824, 826 and 828 are made available as external terminals of the light engine. Using such a light engine, the topology as shown in FIG. 14 could e.g. be realised by connecting terminals 824.2 and 828.2 to the ground terminal 715.6 of the interface module 715, connecting terminal 822.2 to terminal 824.1, connecting terminal 826.1 to terminal 828.1, connecting terminal 822.1 to terminal 715.4 of the interface module 715 and connecting terminal 826.1 to terminal 715.5 of the interface module 715.

As such, the use of an interface module as e.g. shown in FIG. 14 or 15 further enables to modify the topology of a light engine, e.g. light engine 820, when required, provided the terminals of the LEDs or LED groups of the light engine are made accessible. By applying the modular system according to the present invention having an interface module as e.g. shown in FIG. 14 or 15, one may e.g. adjust a topology of the light engine, i.e. the manner in which the LEDs of the light engine are grouped, in case a different LED driver is e.g. applied. As such, the application of the interface module provides in an increased flexibility and functionality of LED based lighting applications; i.e. it becomes more easy to combine particular LED drivers with particular light engines or replace or modify an LED driver or light engine in an existing lighting application.

The synchronisation of any switching actions performed by the LED driver, e.g. to modulate the output current, and by the interface module may be synchronised using any of the methods as described above.

With respect to the application of a modular system as the modular system according to the present invention, it may be worth mentioning that in practice, there are a variety of different stake-holders or parties on the LED or luminaire market. In particular, there are parties that are specialised in developing LED drivers with particular characteristics and a particular connectivity (e.g. a dual current LED driver outputting two controllable currents) and there are parties that are specialised in developing LED fixtures or assemblies whereby a plurality of LEDs are grouped in a particular manner, arranged on a common board and accessible via a terminal. As will be appreciated by the skilled person, the performance of an arbitrary combination of an LED driver with a light engine may often be less or far less than optimal, e.g. with respect to attainable functionality or efficiency or accuracy.

The solution as proposed in the present invention, i.e. a solution that makes use of an interface module that can, in an embodiment, control both the LED driver output and the manner in which this LED driver output is applied in the light engine, may at least partly alleviate any mismatch between a selected LED driver and a selected light engine, thereby providing an improvement of the overall system, e.g. with respect to functionality, efficiency or accuracy.

Using the interface module according to the present invention may also enable to combine an LED driver that is configured to output N supply currents with a light engine that comprises M LEDs or LED groups, whereby M>N. In such an arrangement, the interface module may e.g. be configure, e.g. by means of a switch or switch assembly, to use the N available currents sequentially, depending on the desired illumination characteristic, to power the M LEDs or LED groups that need powering. By doing so, the flexibility to combine LED drivers and light engines can be strongly improved.

A further advantage of subdividing a lighting application in a modular system having an LED driver, a light engine and an interface module is that, in an embodiment, a considerable amount of control operations may be allocated to a control unit of the interface module, rather than requiring an elaborate control functionality in either the LED driver or the light engine. As an example, referring to the modular system as shown in FIG. 14, it may be sufficient for the control unit 730 of the LED driver 710 to receive, at an input terminal 730.1, an input signal 730.4 representative of the desired output currents Ia, Ib, Ic to control the LED driver. In such embodiment, the LED driver thus not need to be configured to determine the desired output currents required to realise a certain illumination characteristic, but rather follows instructions as received from the control unit of the interface module.

It should however be pointed out that, as an alternative or in addition, the control unit 730 may perform the master-role and be configured to receive an input signal representing a desired illumination characteristic, determine a desired switching of the switches of the interface module (e.g. in the form of duty cycle modulation scheme as discussed above), determine a desired current scheme for the different output currents Ia, Ib, Ic (e.g. in the form of a current amplitude modulation scheme as discussed above) and provide the appropriate control signals to realise this to the power converters and the control unit 770 of the interface module.

In an embodiment of the modular system according to the present invention, a control unit as applied in the modular system is configured to determine a required current scheme and duty cycle scheme to be applied by the LED driver, the light engine and/or the interface module by using an optimisation algorithm, the optimisation algorithm being configured to optimise an operating parameter of the modular system, thereby taking into account one or more constraints.

As will be appreciated by the skilled person, in case a multi-channel LED driver (i.e. an LED driver having multiple output terminals that may provide different adjustable output currents) is applied to power a light engine provided with one or more switches or switch assemblies or to power a light engine via an interface module having one or more switches or switch assemblies to connect the light engine to the LED driver, a desired illumination set point may in general be realised in various manners. Even in case only a single current output channel would be available, a desired illumination characteristic of a light engine can be realised in different manners; i.e. there a different ways to control or modulate the output current or the duty cycle of the switches, all resulting in the same illumination characteristic.

Figure 17:
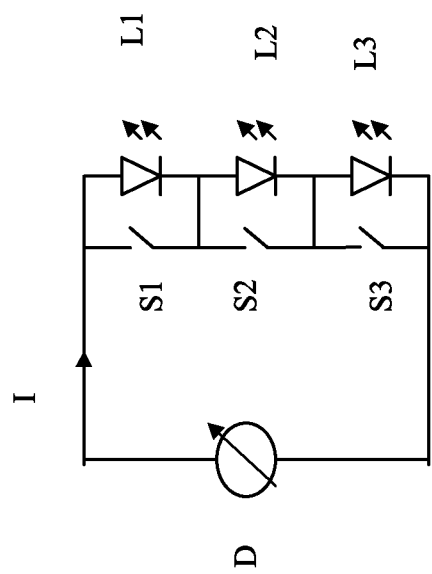
FIG. 17 depict another light engine as can be applied in an embodiment of the present invention.

This can be illustrated by the following example, schematically shown in FIG. 17: Assuming an LED driver D capable of outputting a current I in the range of 0.1 to 1 A and a light engine having a series connection of three LEDs L1, L2, L3, the current through each LED being controllable by a parallel switch S1, S2, S3. Assuming that the LEDs have a different colour and that a nominal intensity and colour correspond to the application of a 1 A current through each of the LEDs at all times (i.e. a duty cycle of 100%, switches S1, S2 and S3 being open all the time). Assume that an illumination set point is desired having an intensity of ⅓th of the nominal intensity and having the nominal colour. Such an illumination set point can be realised in different manners:

by controlling the current to ⅓th the nominal current and keeping the switches open.
  by maintaining the current at its nominal value and closing each of the switches during ⅔th of the time, e.g. during ⅔th of a given period such as a modulation time window as discussed above.

In the latter case, various options exist for the timing of the switching operations, one can e.g. close all switches at the same period of time, e.g. ⅔th of a predefined period or keep each of the switches sequentially open during ⅓th of the predefined period. In the latter case, there is, at each instant, only one switch opened.

As will be clear to the skilled person, there are an infinite number of possibilities to arrive at the desired illumination set point, even in this simple example, in case one would assume that both the current and duty cycles may be varied in a substantially continuous manner.

In case of the application of a multi-channel LED driver and e.g. applying an interface module capable of adjusting the topology or interconnectivity of the LEDs or LED groups of the light engine that is powered, there would even be a much larger number of possible control strategies, in order to realise a desired illumination characteristic.

In accordance with an aspect of the present invention, an algorithm is applied that enables to make a selection among such different possible control strategies, thereby optimising towards a particular operating parameter.

Referring back to the example of FIG. 17, it can be noted that each of the possible manners to control the LED driver and switches S1, S2 and S3 may have particular advantages and disadvantages. Different manners of controlling the modular system may e.g. result in different values of operating parameters of the modular system, in particular operating parameters associated with the efficiency of the overall system (e.g. due to different requirements w.r.t. the number of switching operations needed per unit of time), the accuracy with which the desired illumination set point can be obtained and maintained, the occurrence of disturbances such as flicker.

In an embodiment, the optimisation algorithm focuses on maintaining a forward voltage over the light engine, as an operating parameter, as constant as possible. As will be understood by the skilled person, changes in the forward voltage over the light engine will affect the actual value of the current as supplied by the current source (i.e. the LED driver) and may thus adversely affect the accuracy of the light output, compared to the desired light output. As such, it may be advantageous to device a controlling of the LEDs of the light engine in such a manner that the forward voltage is kept as constant as possible.

Referring to the example given in FIG. 17, one can easily assess that a comparatively large change in forward voltage will occur in case the three switches are operated in synchronism, i.e. closed or opened at the same instants. Alternatively, in case the switches are opened ⅓th of the predefined period in sequence, the change in forward voltage may be comparatively small or close to zero, in case the characteristics of the LEDs are similar.

In an embodiment of the present invention, the optimisation algorithm as applied to derive the best suited control strategy to maintain the forward voltage as constant as possible, may include the following steps, under the assumption that the light engine comprises a plurality of i series connected LEDs:

determine based on the desired illumination set point, the percentage Pi of time that each LED should be on, assuming the nominal current Inom;

determine the sum of the percentages Pn=sum(Pi);

in case the sum of the percentages Pn is smaller than 100, the percentages Pi can be scaled to Pi*100/Pn, while scaling the current to Inom*Pn/100;

by performing these calculations, one can realise the desired illumination set point by sequentially operating the LEDs for periods of time as calculated, applying the scaled current.

In case the sum of the percentages is above 100, and assuming that the applied current cannot exceed the nominal current, one may need to have two LEDs on at the same time.

In this situation, it may also be required to change to amplitude of the current during the predetermined period in order to keep two LEDs on, and only two, on at all times.

In accordance with an embodiment of the present invention, additional boundary conditions or constraints may restrict the possible control strategies.

As an example, in case the light engine comprises a plurality of LEDs that are arranged in parallel, each provided with a switch in series, one needs to make sure that at all times, at least one of the switches is closed, in order for the current of the LED driver to be provided.

As another example, for some LED drivers, the resolution with which the current can be changed may be rather coarse. In such case, a desired scaling as suggested may not be possible in all cases.

In order to facilitate in maintaining the forward voltage over the light engine substantially constant, the modular system according to an embodiment of the present invention makes use of a dummy load.

In an embodiment, the modular system according to the present invention, is configured to provide an output current of a power converter of the LED driver to the dummy load, e.g. by means of a switching operation of a switch available in the modular system, in response to a control signal from a control unit of the modular system.

In general, such a dummy load may be an electronic component over which a voltage is generated when the component is supplied with a current. As an example, a resistor can be mentioned. When a current I is provided to a resistor with resistance value R, a voltage R*I is generated over the component. Other types of components which may be advantageously applied as dummy loads in a modular system according to the present invention include various types of diodes such as Zener-diodes, whereby it is assumed that the diodes are not emitting any visible light or that the emitted light is obscured.

Figure 18:
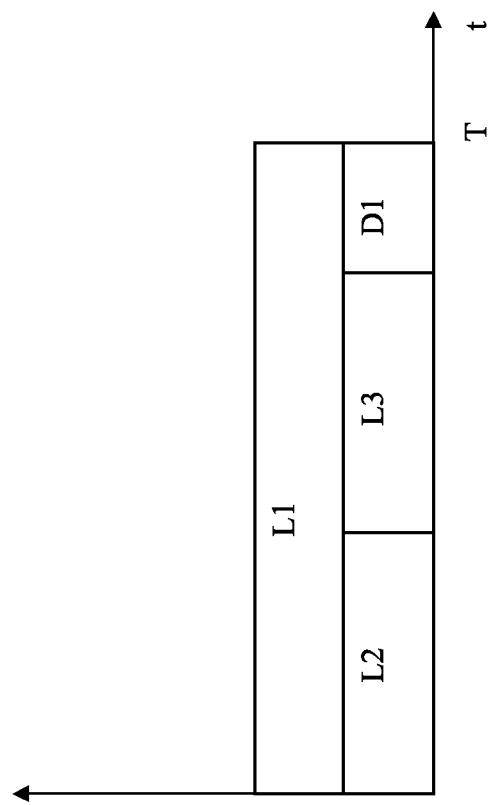
FIG. 18 depict a light engine comprising a dummy load as can be applied in an embodiment of the present invention and a current scheme for driving the light engine.
Figure 18:
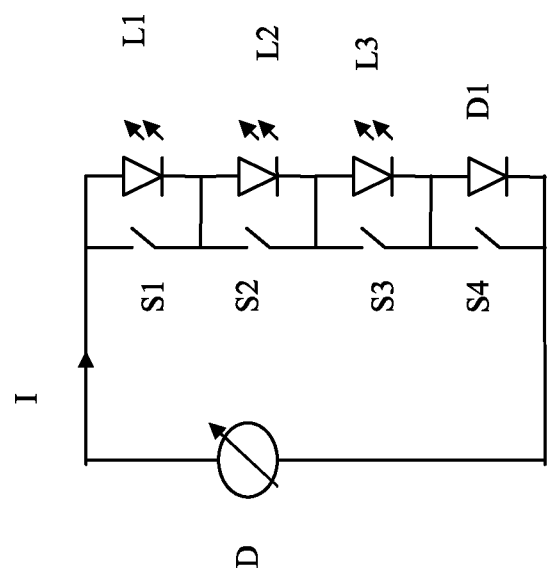

The use of such a dummy load is illustrated in FIG. 18. FIG. 18 on the left schematically shows an LED driver D configured to supply a current I to a light engine comprising three LEDs (L1,L2,L3) and one diode D1 acting as a dummy load.

On the right in FIG. 18, the required on-times for the three LEDs is shown, i.e.:

On-time for L1=100%
On-time for L2=40%
On-time for L3=40%

In order to realise this duty cycle schedule, LED L1 can e.g. be turned on all the time, i.e. during the entire period T, whereas LED L2 and L3 are turned on, sequentially, for 40% of the time. By switching on the dummy load D1 sequentially, for 20% of the time, after LED L3, one can ensure that the forward voltage as perceived by the LED driver D remains substantially constant.

The use of such a dummy load may also be advantageously applied in light engine whereby the LEDs or LED groups are arranged in parallel. In such an arrangement, the LED driver current may be provided to the dummy load in case a series switches of the LEDs or LED groups are open. Such an embodiment may be advantageous in case low dimming levels are required and the LED driver cannot reduce its current below a certain level, e.g. 5% of the nominal current.

In an embodiment, the modular system according to the present invention, is equipped with such a dummy load. It can be noted that such a dummy load may be incorporated in the light engine as e.g. applied in the modular system. Diode D1 as shown in FIG. 9 can be considered an example of such an implementation. It should however be noted that the dummy load may also be implemented in the interface module or even in the LED driver.

In case such a dummy load is provided in the interface module, the light engine may be kept comparatively simple and inexpensive. In such embodiment, the interface module may thus be provided with a dummy load such as a non-emitting diode and a switch or switches to direct a current of a power converter of an LED driver that is connected to it to the dummy load when needed. In an embodiment, the dummy load may comprise multiple diodes connected in series, each diode being provided with a parallel switch to short-circuit it. By doing so, the interface module, or more particular the control unit controlling the switches of the interface module may adjust the dummy load as required in order to maintain the forward voltage as seen by the power converter or power converters of the LED driver as constant as possible.

As described above, an amplitude of an output current of a power converter of an LED driver (e.g. currents Ia, Ib, Ic) may be adjusted, i.e. controlled by providing an appropriate set point to the control unit of the LED driver, thereby controlling a switch of the power converter, e.g. switch 220.2 as shown in FIG. 1.

In an embodiment, the power converter as applied, e.g. a switched mode power converter such as a Buck, Boost or hysteretic converter, further comprises a switch, e.g. referred to as a PWM-switch, for turning the output current ON or OFF. As such, rather than modulation the amplitude of the current by controlling the switch of the SMPS, the output current can be modulated between zero and a value set by the received set point. Such modulation may e.g. be referred to as PMW-modulation and thus enable to bring the output current to zero during a desired period, e.g. half of a modulation time window as described above.

The controlling of such a PWM-switch, as may be available in each power converter as applied in an LED driver of the modular system according to the present invention thus provides an additional means to control the current as supplied to the light engine.

In an embodiment of the present invention, the switching instants, i.e. the instants at which modulations to the currents (including modulations or adjustments which change where the currents are supplied to) are predetermined or fixed within predetermined modulation time window.

As an example, a modulation time window of 3.333 ms (300 Hz) can be considered subdivided into 8 blocks having a length of 416 μs (2400 Hz).

In an embodiment of the present invention, any desired switching actions or switching operations, or adjustments to set points such as current set points, are only performed at predetermined instants, referred to as switching instants, within a modulation time window. By doing so, all switching operations may be synchronised.

In an embodiment, a control unit of the modular system according to the invention, is configured to determined a required current modulation scheme or duty cycle modulation scheme, taking the predetermined instants into account as a constraint.

In an embodiment, the constraint as applied by the control unit comprises a set of possible current values available for the current modulation scheme and/or a set of switching instants available for switching operations within the modulation time window. With respect to the former set in the constraint, it can be mentioned that, by doing so, one can take into account any limitations in the resolution of the current or currents as outputted by the power converters of the LED driver.

In such a situation, i.e. when constraining the possible current levels or switching instants, and assuming that multiple power converters, and thus output currents, are available, there may still be multiple manners to arrive at a particular desired illumination set points.

In an embodiment, the control unit configured to determine the current modulation scheme or duty cycle modulation scheme may further be configured to make use of a quality function to assess which control manner provides in the best result. What is considered 'the best result' may depend on circumstances and/or may be determined by what a user considers important.

As discussed above, one manner to accurately control the current through the LEDs of the light engine is to ensure that the forward voltage over the LEDs or LED groups is maintained constant, as much as possible. As such, when an accurate current control is aimed for, the quality function may comprise a function, referred to as the forward voltage assessment function, describing the forward voltage variation for a given control manner, i.e. for a given current modulation scheme or duty cycle modulation scheme. This forward voltage assessment function thus provides in a value, for a given current modulation scheme or duty cycle modulation scheme, representative of how well the forward voltage is maintained. As will be understood by the skilled person, various functions or evaluations could be implemented to arrive at such as value. As an example, the value representative of how well the forward voltage is maintained may e.g. be the number of times the forward voltage is not maintained during the modulation time period. The forward voltage assessment function may further take into account the amplitude in the change in forward voltage.

In an embodiment, 'the best result' may be defined as the control manner that provides in the most efficient operation of the LED driver, the light engine or the interface module. In such embodiment, the quality function may comprise a function, referred to as the efficiency assessment function, that is configured to provide in a value representative of the efficiency of the particular component or of the system as a whole, for a given control manner, i.e. a particular current modulation scheme or duty cycle modulation scheme.

Such an efficiency assessment function may e.g. take into account electric properties of the power converters (e.g. efficiency characteristics as a function of output current), or the switches used, e.g. in the interface module, or the LEDs available in the light engine.

In an embodiment, the quality function as used to assess, by the control unit, which control manner provides in 'the best result', may be a combination, e.g. a weighted combination, of a forward voltage assessment function and an efficiency assessment function. In the latter case, weight coefficients may be provided to scale the values of efficiency or forward voltage assessment, thereby enabling to define which of both aspects (efficiency or maintaining the forward voltage) is the most important.

In an embodiment, the weight coefficients may be provided by a user, e.g. via a user interface, to the control unit assessing the quality function.

In addition, or as an alternative, the weight coefficients may be predetermined or pre-set. The weight coefficients may also, in an embodiment, depend on an operational characteristic or parameter of the modular system. As an example, the weight coefficients may e.g. be made dependent on the desired intensity of the light as generated. In such case one may e.g. consider the efficiency to be more important at a high intensity level and consider maintaining the forward voltage constant to be more important at a low intensity level.

In an embodiment of the present invention, whereby multiple power converters are applied, the operation of the power converters, in particular the operation of the switch of the switched mode power converter as applied in the power converters, is synchronised at certain instants. In an embodiment of the present invention, the power converters as applied in the LED driver are hysteretic Buck converters which typically drift or operate out of sync. In an embodiment of the present invention, the applied hysteretic converters are provided, simultaneously, with a control signal, to synchronize them. Such a synchronisation signal may e.g. comprise a short pulse (positive or negative) applied to a reference voltage of the power converter. Upon application of such a pulse in the reference voltage (e.g. a voltage provided to a comparator of the power converter, the comparator comparing the reference voltage with a voltage representing a desired output current), the operation of the hysteretic converters is synchronised, i.e. they will substantially switch at the same instants)

In an embodiment, of the present invention, the synchronisation of the power converters is repeated at predetermined instants. As an example, the synchronisation may occur at the starting instant of the modulation time window or may occur at the switching instants within the modulation time window as described above. Referring to the example above, the power converters could thus be reset or synchronised at the start of each 2400 Hz block. As an alternative, or in addition, one may e.g. subdivide a modulation time window into different periods or blocks and assign an LED, or LEDs or an LED group to each of said periods or blocks, whereby, as a constraint, the current through the assigned LED or LEDs or LED group may only be adjusted during one block assigned to it. Such a constraint on switching instants or current modulation may also have a beneficial effect on the amount and size of forward voltage variations as perceived by the power converters supplying a current or currents to the light engine.

As already pointed out above, the synchronisation of the operation of the power converter or power converters with the switching of the switches controlling the current or currents through the LEDs or LED groups is important because it may affect (due to the ripple on the outputted current of a power converter) the average current as supplied to a particular LED or LED group and thus the intensity or colour, in case multiple LEDs or groups of LED with different colours are powered. When the operation of the power converter and the switching operations are out of sync, this could results in variations in the illumination that may be perceived by the user.

The synchronisation of the power converters and the switching operations may also be important in case of the application of visual light communication (VLC) In particular when the LED driver as applied comprises multiple power converters, each power converter configured to power a particular LED or LED group of a light engine, the quality of a VLC signal may be improved by synchronising the switching operations. A VLC signal may e.g. comprise an array of pulses (positive or negative) superimposed on a substantially constant current level, referred to as the base current level, whereby the array of pulses may be detected, e.g. by a smartphone and interpreted. Typically, the VLC signal is a coded representation of data that is to be transmitted. When multiple LED groups are used to transmit such a signal, it is important that pulses of the different LED groups are synchronised, in order to have the maximum difference in intensity. As such, in an embodiment of the present invention, a control unit of either the LED driver having the multiple power converters or a control unit of the light engine or a control unit of the interface module is configured to synchronise the amplitude modulation of the currents through the different LED groups representing the VLC signal.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/ dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A modular system comprising a first component comprising an LED driver, a second component comprising a light engine and a third component comprising an interface module,
the light engine comprising a plurality of LEDs or LED groups;
the interface module comprising:
an input terminal for connecting to an output terminal of the LED driver;
an output terminal for connecting to an input terminal of the light engine;
a switch assembly comprising one or more switches for controlling a supply current of the LED driver, the supply current being received via the input terminal and provided to the light engine via the output terminal;
a control unit having an input terminal for receiving a set point representing a desired illumination characteristic of the light engine, the control unit further having a processing unit for processing the set point and determining control signals for the switch assembly,
the LED driver comprising:
a switched mode power converter configured to output the supply current;
an LED driver control unit configured to control a switch of the switched mode power converter, thereby controlling the supply current;
wherein the control unit and the LED driver control unit are configured to co-operate and control the supply current and the supply of the supply current to the light engine in accordance with the desired illumination characteristic, and wherein the control unit and the LED driver control unit are configured to synchronize a switching operation of the switch of the switched mode power converter with a switching operation of the one or more switches of the switch assembly of the interface module,
wherein the LED driver control unit is configured to control the LED driver to provide a current pulse during a predetermined period to synchronize the switching operation of the switch of the switched mode power converter with the switching operation of the one or more switches of the switch assembly of the interface module,
wherein the current pulse comprises multiple micropulses configured to transmit information, and
wherein a duration of the multiple micropulses is a fraction of a period of the predetermined period.

2. The modular system according to claim 1, wherein the control unit and the LED driver control unit are configured to control the LED assembly to generate the desired illumination characteristic by controlling the switch and the one or more switches within a predetermined modulation time window.

3. The modular system according to claim 2, wherein the control unit is configured to:

receive, at an input terminal of the control unit, an input signal representing the desired illumination characteristic;

determine, based on the desired illumination characteristic, a current amplitude modulation scheme, optionally a duty cycle modulation scheme and a time-division scheme;

provide an output signal representative of the current amplitude modulation scheme and optionally the duty cycle modulation scheme to the LED driver control unit; wherein the LED driver control unit is configured to apply the current amplitude modulation scheme and optionally the duty cycle modulation scheme within the modulation time window and wherein the control unit is configured to apply the time-division scheme within the modulation time window, in order to generate the desired illumination characteristic.

4. The modular system according to claim 3, wherein the current amplitude modulation scheme represents an amplitude of the supply current as a function of time within the modulation time window.

5. The modular system according to claim 3, wherein the duty cycle modulation scheme represents switching operations for the switch of the switched mode power supply as a function of time within the modulation time window.

6. The modular system according to claim 3, wherein the time-division scheme represents a subdivision of the modulation time window into a plurality of sub-windows, whereby each of the plurality of LEDs or LED groups is provided with the supply current during only one sub-window of the plurality of sub-windows.

7. The modular system according to claim 6, wherein the subdivision of the modulation time window into the plurality of sub-windows is based on a desired color of the illumination characteristic.

8. The modular system according to claim 6, wherein the sub-windows have the same duration.

9. The modular system according to claim 1, wherein the current pulse is indicative for a start of a modulation time window.

10. The modular system according to claim 1, wherein the interface module is configured to detect a timing of the current pulse.

11. The modular system according to claim 9, wherein the current pulse comprises one or more micropulses.

12. The modular system according to claim 11, wherein the interface module is configured to identify a start of a sub-window of the modulation time window based on the micropulses.

13. The modular system according to claim 1, wherein the control unit and the LED driver control unit are configured to synchronize a switching operation of the switch of the switched mode power converter with a switching operation of the one or more switches of the switch assembly by exchanging a synchronization signal.

14. The modular system according to claim 1, further comprising a serial communication link for connecting a first control unit to a second control unit.

15. The modular system accordingly to claim 1, wherein each micropulse of the multiple micropulses is a sub-window for communication of the information from the LED driver control unit to the interface module.

16. A modular system comprising a first component comprising an LED driver, a second component comprising a light engine and a third component comprising an interface module, the light engine comprising a plurality of LEDs or LED groups;

the interface module comprising:
   an input terminal for connecting to an output terminal of the LED driver;
   an output terminal for connecting to an input terminal of the light engine;
   a switch assembly comprising one or more switches for controlling a supply current of the LED driver, the supply current being received via the input terminal and provided to the light engine via the output terminal;
   a control unit having an input terminal for receiving a set point representing a desired illumination characteristic of the light engine, the control unit further having a processing unit for processing the set point and determining control signals for the switch assembly, the LED driver comprising:
   a switched mode power converter configured to output the supply current;
   an LED driver control unit configured to control a switch of the switched mode power converter, thereby controlling the supply current;

wherein the control unit and the LED driver control unit are configured to co-operate and control the supply current and the supply of the supply current to the light engine in accordance with the desired illumination characteristic, and wherein the control unit and the LED driver control unit are configured to synchronize a switching operation of the switch of the switched mode power converter with a switching operation of the one or more switches of the switch assembly of the interface module, wherein the LED driver control unit is configured to control the LED driver to provide a current pulse during a predetermined period to synchronize the switching operation of the switch of the switched mode power converter with the switching operation of the one or more switches of the switch assembly of the interface module, wherein the current pulse comprises multiple micropulses configured to transmit information, wherein a duration of the multiple micropulses is a fraction of a period of the predetermined period, and wherein the interface module is configured to detect the current pulse based on a measurement of the supply current or a measurement of a forward voltage across the LED or LED group to which the supply current is supplied.

17. The modular system accordingly to claim 16, wherein each micropulse of the multiple micropulses is a sub-window for communication of the information from the LED driver control unit to the interface module.

* * * * *